US012664035B2

(12) United States Patent
Popat et al.

(10) Patent No.: US 12,664,035 B2
(45) Date of Patent: Jun. 23, 2026

(54) CENTRALIZED SMART SELF-CONFIGURING CHAOS POLICIES AND EXPERIMENTS

(71) Applicant: Dell Products L.P., Round Rock, TX (US)

(72) Inventors: Rajiv Popat, Kolkata (IN); Irfan Gilani, Cedar Park, TX (US); Devindran Ramadass, Kajang (MY)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 18/739,558

(22) Filed: Jun. 11, 2024

(65) Prior Publication Data

US 2025/0377959 A1      Dec. 11, 2025

(51) Int. Cl.
*G06F 11/00* (2006.01)
*G06F 11/07* (2006.01)
*G06F 11/30* (2006.01)

(52) U.S. Cl.
CPC ........ *G06F 11/008* (2013.01); *G06F 11/0766* (2013.01); *G06F 11/3065* (2013.01)

(58) Field of Classification Search
CPC .............. G06F 11/008; G06F 11/0766; G06F 11/3065; G06F 11/0709; G06F 11/079; G06F 11/2247; G06F 11/2257; G06F 11/3006
See application file for complete search history.

(56) References Cited

U.S. PATENT DOCUMENTS

| | | | |
|---|---|---|---|
| 9,898,604 | B2 | 2/2018 | Fang et al. |
| 10,824,726 | B1 | 11/2020 | Herman Saffar et al. |
| 10,866,851 | B2 | 12/2020 | Basiri et al. |
| 10,936,717 | B1 | 3/2021 | Herman Saffar et al. |
| 11,356,324 | B2 | 6/2022 | Gefen et al. |
| 11,361,197 | B2 | 6/2022 | Calmon et al. |
| 11,513,935 | B2 | 11/2022 | Przestrzelski |
| 2022/0286362 | A1 | 9/2022 | Gamliel et al. |
| 2023/0333903 | A1 | 10/2023 | White et al. |

(Continued)

OTHER PUBLICATIONS

Basiri et al., "Automating Chaos Experiments in Production;" Proceedings of 2019 IEEE/ACM 41st International Conference on Software Engineering: Software Engineering in Practice (ICSE-SEIP); May 25-31, 2019; 10 Pages.

*Primary Examiner* — Joseph D Manoskey
(74) *Attorney, Agent, or Firm* — Daly, Crowley, Mofford & Durkee, LLP.

(57) ABSTRACT
A log stream, generated in a system for at least a first issue, is monitored, the log stream comprising information regarding operations of at least one component in operable communication with the system. The log stream is analyzed to identify and group the first issue together one or more other issues in a grouping, wherein the grouping comprises issues that are associated with at least a first chaos that can be injected into the system. Based on the first chaos, a chaos policy, usable to run at a chaos experiment on the system, is generated automatically, wherein the chaos policy is configured to inject the chaos into the system. The chaos policy can be automatically added to a set of chaos policies associated with a chaos engine in operable communication with the system, which chaos engine runs one or more chaos experiments on the system.

17 Claims, 7 Drawing Sheets

(56) References Cited

U.S. PATENT DOCUMENTS

| | | | |
|---|---|---|---|
| 2024/0320318 A1* | 9/2024 | Bellam | G06F 21/45 |
| 2025/0053501 A1* | 2/2025 | Ayyadurai | G06F 11/3684 |
| 2025/0077374 A1* | 3/2025 | Baker | G06F 11/3414 |
| 2025/0217270 A1* | 7/2025 | Singh | G06F 11/3688 |

* cited by examiner

```
1    // 20200517120854
2    // http://localhost:8080/actuator/chaosmonkey
3
4  ▾  {
5  ▾    "chaosMonkeyProperties": {
6        "enabled": true
7      },
8  ▾    "assaultProperties": {
9        "level": 5,
10       "latencyRangeStart": 1000,
11       "latencyRangeEnd": 3000,
12       "latencyActive": true,
13       "exceptionsActive": false,
14  ▾    "exception": {
15         "type": null,
16         "arguments": null
17       },
18       "killApplicationActive": false,
19       "memoryActive": false,
20       "memoryMillisecondsHoldFilledMemory": 90000,
21       "memoryMillisecondsWaitNextIncrease": 1000,
22       "memoryFillIncrementFraction": 0.15,
23       "memoryFillTargetFraction": 0.25,
24       "runtimeAssaultCronExpression": "OFF",
25       "watchedCustomServices": null,
26       "frozen": false,
27  ▾    "targetSource": {
```

102

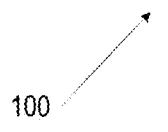

CENTRALIZED SMART SELF-CONFIGURING CHAOS POLICIES AND EXPERIMENTS

FIELD

Embodiments of the disclosure generally relate to operations of computer systems and systems and methods for detecting and testing computer system vulnerabilities, including using chaos experiments to check for vulnerabilities. More particularly, embodiments of the disclosure include systems and methods to automatically configure and adjust chaos policies and chaos experiments.

BACKGROUND

Failure detection, prediction, and prevention is a generic and common problem across the information technology (IT) space. It is especially challenging when a system that comprises many interconnected and/or interrelated, distributed components (e.g., systems, subsystems, and software services) is experiencing failure, because the failure of one component can have a significant ripple effect on many other components and operations. Despite major efforts, both in industry and academia, it can be challenging to find solutions that are reliable in helping to detect, predict, simulate for, and/or prevent such failures.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

An approach to a quality assurance of various types of computer system architectures, such as microservice architectures, can involve chaos testing. Chaos engineering and testing can generally comprise a discipline of experimenting on a computer system in order to build confidence in the system's capability to withstand turbulent and unexpected conditions. Chaos testing can be implemented to create continuous, random, or systematic failures to a system, and then test the ability of the system to overcome these failures. For example, a chaos test can generally comprise applying a random test to a system (e.g., causing a microsystem not to respond), followed by assessing a set of assertions about the state of the system after the random test. A chaos test can be considered to succeed (i.e., the system operates properly despite the chaos) where all assertions succeed, and can be considered to fail (i.e., the system does not sufficiently operate properly due to the chaos) where at least one of the assertions fails.

Since Netflix introduced chaos engineering as a separate technology stream, organizations have been spending time and money picking chaos engineering products, configuring chaos policies manually, and tweaking them to test different chaos scenarios. Today, most of the configuration of chaos policies on the chaos engineering products is entirely manual and by hand. For many reasons, which are discussed further herein, manual configuration of chaos policies can be subject to fallacies and human bias when trying to manually guess and optimize the chaos levels of different applications. Manual configuring of chaos policies is not an optimum way to solve the issue of being able to test different chaos scenarios.

Consider the configuration of FIG. 1, which is an illustrative image 100 showing an example of a prior art chaos policy configuration, which is used in connection with Netflix's chaos monkey. As the illustrative image 100 of FIG. 1 illustrates, assault properties 102 are being manually configured using a Javascript Object Notation (JSON) file. Essentially, this means that the chaos engine only creates the type and magnitude of chaos it was configured to create.

In the world of chaos engineering, most commercial products that are being released, like Chaos Monkey, are dependent on some sort of policy/experiment configuration done manually by the Development or DevOps team. This means that these chaos policies have to be manually written, deployed, and then maintained over time. The whole idea of configuring these chaos policies manually has its own set of problems. For example, the policies can be subject to human biases and fallacies about what is the "worst" that can happen by focusing on what has been the "worst" thing to happen to date. In addition, human biases can impact development of policies by focusing on "today's" problem instead of "tomorrow's" issue. Moreover, some planning for fault testing, to put into chaos policies, focuses on fixing known flaws instead of hidden issues, which can be analogous to "survivor bias" (which focuses on individuals or things that "survived" a test or selection process).

Consider the example of planes damaged during World War 2. Part of some ways of improving the design of these planes had focused on looking at planes that returned from war and analyzing where they were hit to strengthen those areas. The hole pattern in such planes shows where WW2-era planes were hit but could still return home. However, this focus on the hole pattern demonstrates a type of "survivorship bias," because in planes that were able to return home, the hits to such planes arguably are disproportionally present in areas not vital for returning home safely—therefore exhibiting survivorship bias. If this pattern of holes is used to decide where to reinforce the planes (e.g., to reinforce commonly hit areas), this would not necessarily help to improve the ability of planes to withstand future hits. Instead, it might be more important to know what is the hit pattern on fatally damaged planes which were unable to return home, to better reinforce those areas (i.e., the hits on other locations on the plane), as those are the areas that prevented safe flight. And, in fact, statistician Abraham Wald posited, at the time, that the bullet holes in the returning aircraft represented areas where a bomber could take damage and still fly well enough to return safely to base. Wald thus proposed that the military reinforce areas where the returning aircraft were unscathed, because he inferred based on the pattern of damage of surviving planes, that planes hit in those other areas were the ones most likely to be lost and could not return to be analyzed.

Similarly, in the field of chaos engineering, it can be important for a chaos engine to consider issues that only show up as small problems in a log, but which have potential to blow up into a major problem. However, if engineers are focusing on certain problems due to survivor bias and other issues, the engineers may not accurately guess future problems and thus will not take such future problems into account when manually configuring a chaos engine.

In at least some embodiments herein, the idea of manually configuring chaos policies is being challenged. At least some embodiments herein recommend an intelligent approach where chaos engines can automatically configure themselves with the most appropriate chaos policies. At least some embodiments herein help to showcase the fallacies and human biases involved in trying to manually guess and optimize the chaos levels of different applications and why this is not an intelligent way to solve this problem. At least some embodiments herein also demonstrate why manual configuration of chaos policies can result in heavy cost and time for organizations and has very little benefit from the perspective of anti-fragility (the ability of an entity not just to withstand shock or difficulty, but also to improve from it).

Another issue is that, as the world digitally transforms, the footprint of applications are exponentially growing, including multi-cloud deployments and advancement in workload mobility techniques. Given the flexible nature of hosting complex systems, relying on humans to maintain and keep the policies such as chaos policies up to date is quite impractical and becoming more and more unrealistic. Attempting to configure a chaos policy manually in a chaos engine has many downsides. Instead, in accordance with some embodiments herein, it is advantageous if the chaos policy and/or the chaos engine operate, effectively, as a living breathing entity that can intelligently evolve based on today's errors (both large and small), that can automatically magnify errors that might happen tomorrow, that can automatically check if past issues have returned, and that can allow the teams to embrace chaos, at least in the limited blast perimeter of UAT environments.

In certain embodiments, solutions are provided for these and other issues.

In one aspect, a computer-implemented method is provided. A log stream, generated in a system for at least a first issue, is monitored, the log stream comprising information regarding operations of at least one component in operable communication with the system. The log stream is analyzed to identify and group the first issue together one or more other issues in a grouping, wherein the grouping comprises issues that are associated with at least a first chaos that can be injected into the system. Based on the first chaos, a first chaos policy, usable to run at a first chaos experiment on the system, is generated automatically, wherein the first chaos policy is configured to inject the first chaos into the system.

In certain embodiments, an alert to a developer of the system is generated automatically if, based on results of the first chaos experiment, the system does not have resilience for the first chaos. In certain embodiments, the first chaos policy is added to a set of chaos policies used for running a first chaos experiment on the system, and the computer-implemented method further comprises determining, based on a result of the first chaos experiment, whether the system has resilience for the first chaos; and removing the first chaos policy, automatically, from the set of chaos policies if, based on the result of the first chaos experiment, the system has resilience for the first chaos.

In some embodiments, if the first chaos policy is removed, the first chaos policy is added to a regression queue, the regression queue comprising information relating to one or more types of chaos for which the system has demonstrated, based on at least one or more corresponding respective chaos experiments, that it has resilience. In some embodiments, the regression queue is associated with a set of priority factors, wherein the set of priority factors is configured to define when an automatic regression analysis is added to a second chaos experiment run on the system, wherein the computer-implemented method further comprises selecting, based on the set of priority factors, at least one type of chaos, from the one or more types of chaos stored in the regression queue, to inject into the system as part of the second chaos experiment.

In some embodiments, a determination is made whether the log stream comprises information relating to a second issue that corresponds to a critical function of the component, and a magnitude of the second issue is magnified such that a second chaos policy is automatically generated, the second chaos policy is configured to inject a second chaos into the system, wherein the second chaos is related to the critical function of the component. In some embodiments, a determination is made whether the second issue corresponds to a critical function based on an execution count associated with the critical function. In some embodiments, the first chaos policy is automatically added to a set of chaos policies associated with a chaos engine in operable communication with the system, wherein the chaos engine is configured to use the set of chaos policies to run one or more chaos experiments on the system.

In some embodiments, if the chaos engine is operating in accordance with the set of chaos policies, the computer-implemented method further comprises automatically configuring the chaos engine to automatically restart if anything in the set of chaos policies changes.

In another aspect, a system is provided, comprising a processor and a non-volatile memory in operable communication with the processor and storing computer program code that, when executed on the processor, causes the processor to execute a process operable to perform certain operations, including: monitoring a log stream generated in an information system for at least a first issue, the log stream comprising information regarding operations of at least one component in operable communication with the information system; analyzing the log stream to identify and group the first issue together one or more other issues in a grouping, wherein the grouping comprises issues that are is associated with at least a first chaos that can be injected into the information system; and generating automatically, based on the first chaos, a first chaos policy usable to run at a first chaos experiment on the information system, wherein the first chaos policy is configured to inject the first chaos into the information system.

In some embodiments, the first chaos policy is added to a set of chaos policies used for running a first chaos experiment on the information system and, the processor of the system further stores computer program code that, when executed on the processor, causes the processor to determine, based on a result of the first chaos experiment, whether the information system has resilience for the first chaos; and to remove the first chaos policy, automatically, from the set of chaos policies if, based on the result of the first chaos experiment, the information system has resilience for the first chaos.

In some embodiments, the processor of the system further stores computer program code that, when executed on the processor, causes the processor to add, if the first chaos policy is removed, the first chaos policy to a regression queue, the regression queue comprising information relating to one or more types of chaos for which the information system has demonstrated, based on at least one or more corresponding respective chaos experiments, that it has resilience. In some embodiments, the regression queue is associated with a set of priority factors, wherein the set of priority factors is configured to define when an automatic regression analysis is added to a second chaos experiment run on the information system, wherein the processor of the system further stores computer program code that, when executed on the processor, causes the processor to select, based on the set of priority factors, at least one type of chaos, from the one or more types of chaos stored in the regression queue, to inject into the information system as part of the second chaos experiment.

In some embodiments, the processor further stores computer program code that, when executed on the processor, causes the processor to determine whether the log stream comprises information relating to a second issue that corresponds to a critical function of the component; and to magnify a magnitude of the second issue such that a second chaos policy is automatically generated, the second chaos policy is configured to inject a second chaos into the information system, wherein the second chaos is related to the critical function of the component.

In some embodiments, the processor further stores computer program code that, when executed on the processor, causes the processor to automatically add the first chaos policy to a set of chaos policies associated with a chaos engine in operable communication with the information system, wherein the chaos engine is configured to use the set of chaos policies to run one or more chaos experiments on the information system. In some embodiments, if the chaos engine is operating in accordance with the set of chaos policies, the processor further stores computer program code that, when executed on the processor, causes the processor to automatically configure the chaos engine to automatically restart if anything in the set of chaos policies changes.

In a further aspect, a computer program product is provided, the computer program product including a non-transitory computer readable storage medium having computer program code encoded thereon that when executed on a processor of a computer causes the computer to operate a system, where the computer program product comprises: computer program code for monitoring a log stream generated in the system for at least a first issue, the log stream comprising information regarding operations of at least one component in operable communication with the system; computer program code for analyzing the log stream to identify and group the first issue together one or more other issues in a grouping, wherein the grouping comprises issues that are is associated with at least a first chaos that can be injected into the system; and computer program code for generating automatically, based on the first chaos, a first chaos policy usable to run at a first chaos experiment on the system, wherein the first chaos policy is configured to inject the first chaos into the system.

In some embodiments, the computer program product further comprises: computer program code for adding the first chaos policy is added to a set of chaos policies usable to conduct chaos experiments on the system; computer program code for determining, based on a result of the first chaos experiment, whether the system has resilience for the first chaos; and computer program code for removing the first chaos policy, automatically, from the set of chaos policies if, based on the result of the first chaos experiment, the system has resilience for the first chaos.

In some embodiments, the computer program product further comprises computer program code for adding, if the first chaos policy is removed, the first chaos policy to a regression queue, the regression queue comprising information relating to one or more types of chaos for which the system has demonstrated, based on at least one or more corresponding respective chaos experiments, that it has resilience. In some embodiments, the computer program product further comprises computer program code for automatically adding the first chaos policy to a set of chaos policies associated with a chaos engine in operable communication with the system, wherein the chaos engine is configured to use the set of chaos policies to run one or more chaos experiments on the system.

Implementations of the described techniques may include hardware, a method or process, or computer software on a computer-accessible medium. It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which:

FIG. 1 is an illustrative example of a prior art chaos policy configuration;

The drawings are not to scale, emphasis instead being on illustrating the principles and features of the disclosed embodiments. In addition, in the drawings, like reference numbers indicate like elements.

DETAILED DESCRIPTION

Figure 2:
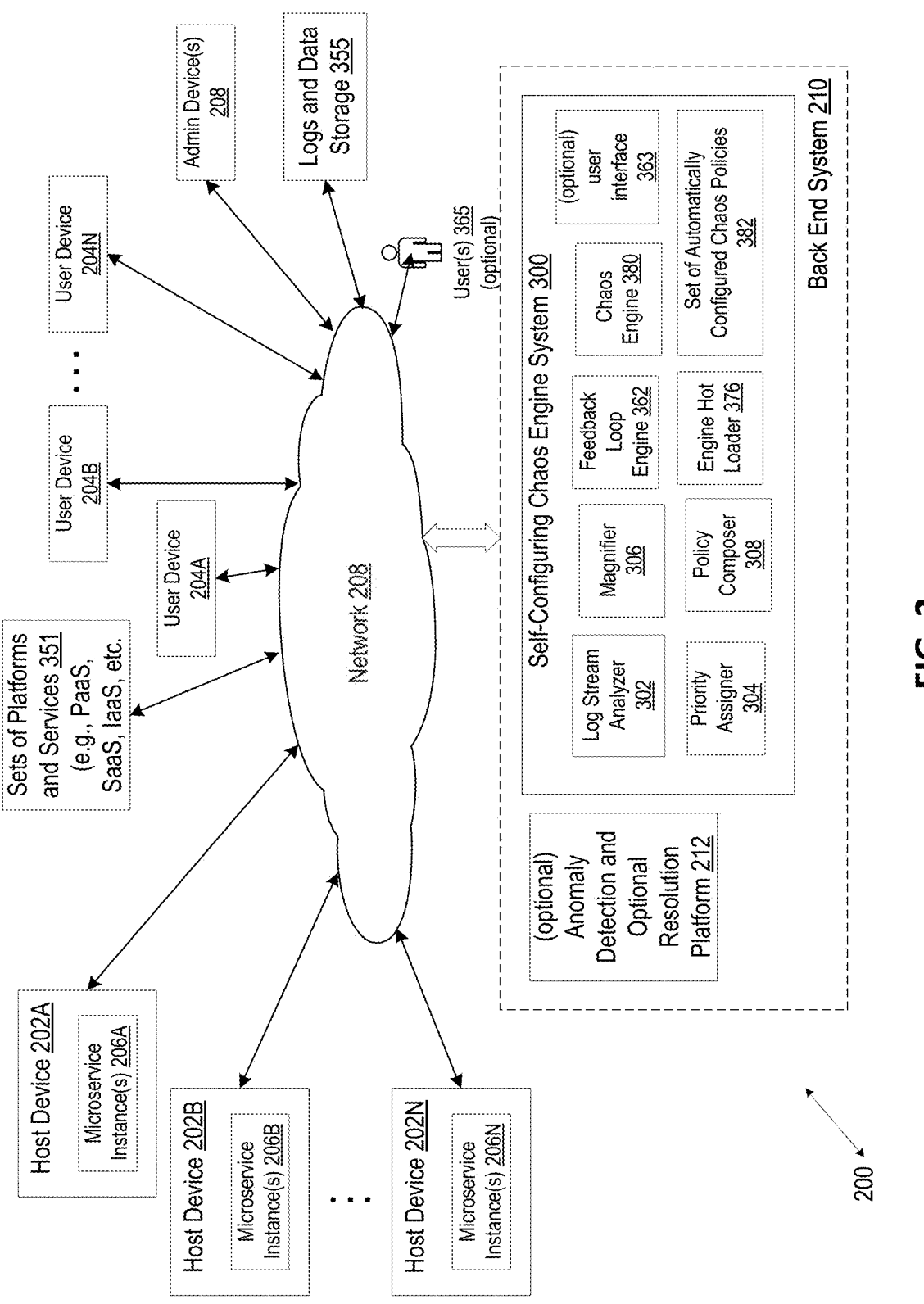
FIG. 2 is an illustration of an exemplary information processing system that includes a Self-Configuring Chaos Engine System, in accordance with one embodiment.

Before describing details of the particular systems, devices, arrangements, frameworks, and/or methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

Illustrative embodiments will be described herein with reference to exemplary computer and information processing systems and associated computers, servers, storage devices and other processing devices. It is to be appreciated, however, that embodiments are not restricted to use with the particular illustrative system and device configurations shown. The following terminology definitions (which are all intended to be broadly construed), which are in alphabetical order, may be helpful in understanding one or more of the embodiments described herein and should be considered in view of the descriptions herein, the context in which they appear, and knowledge of those of skill in the art.

The term "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications and may be implemented on top of other systems.

The term "Cloud computing" is intended to refer to all variants of cloud computing, including but not limited to public, private, and hybrid cloud computing. In certain embodiments, cloud computing is characterized by five features or qualities: (1) on-demand self-service; (2) broad network access; (3) resource pooling; (4) rapid elasticity or expansion; and (5) measured service. In certain embodiments, a cloud computing architecture includes front-end and back-end components. Cloud computing platforms, called clients or cloud clients, can include servers, thick or thin clients, zero (ultra-thin) clients, tablets and mobile devices. For example, the front end in a cloud architecture is the visible interface that computer users or clients encounter through their web-enabled client devices. A back-end platform for cloud computing architecture can include single tenant physical servers (also called "bare metal" servers), data storage facilities, virtual machines, a security mechanism, and services, all built in conformance with a deployment model, and all together responsible for providing a service. In certain embodiments, a cloud native ecosystem is a cloud system that is highly distributed, elastic and composable with the container as the modular compute abstraction. One type of cloud computing is software as a service (SaaS), which provides a software distribution model in which a third-party provider hosts applications and makes them available to customers over a network such as the Internet. Other types of cloud computing can include infrastructure as a service (IaaS) and platform as a service (PaaS).

The term "Computer network" refers at least to methods and types of communication that take place between and among components of a system that is at least partially under computer/processor control, including but not limited to wired communication, wireless communication (including radio communication, Wi-Fi networks, BLUETOOTH communication, etc.), cloud computing networks, telephone systems (both landlines and wireless), networks communicating using various network protocols known in the art, military networks (e.g., Department of Defense Network (DDN)), centralized computer networks, decentralized wireless networks (e.g., Helium, Oxen), networks contained within systems (e.g., devices that communicate within and/ or to/from a vehicle, aircraft, ship, weapon, rocket, etc.), distributed devices that communicate over a network (e.g., Internet of Things), and any network configured to allow a device/node to access information stored elsewhere, to receive instructions, data or other signals from another device, and to send data or signals or other communications from one device to one or more other devices.

"Computer system" refers at least to processing systems that could include desktop computing systems, networked computing systems, data centers, cloud computing and storage systems, as well as other types of processing systems comprising various combinations of physical and virtual processing resources. A computer system also can include one or more desktop or laptop computers, and one or more of any type of device with spare processing capability. A computer system also may include at least one data center or other type of cloud-based system that includes one or more clouds hosting tenants that access cloud resources.

"Computing resource" at least refers to any device, endpoint, component, element, platform, cloud, data center, storage array, client, server, gateway, or other resource, which is part of an IT infrastructure associated with an enterprise.

The term "enterprise" as used herein at least may comprise, for example, one or more businesses, one or more corporations or any other one or more entities, groups, or organizations. An "entity" as illustratively used herein at least may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used and defined herein.

The term "Entity" at least refers to one or more persons, systems, devices, enterprises, and/or any combination of persons, systems, devices, and/or enterprises.

The terms "information processing system, "information handling system," and/or "information system," as used herein are intended to be broadly construed, so as to at least encompass, for example, processing systems comprising cloud computing and storage systems, as well as other types of processing systems comprising various combinations of physical and virtual processing resources. An information processing system/information system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered to be "private clouds."

"Internet of Things" (IoT) refers at least a broad range of internet-connected devices capable of communicating with other devices and networks, where IoT devices can include devices that themselves can process data as well as devices that are only intended to gather and transmit data elsewhere for processing. An IoT can include a system of multiple interrelated and/or interconnected computing devices, mechanical and digital machines, objects, animals or people that are provided with unique identifiers (UIDs) and the ability to transfer data over a network without requiring human-to-human or human-to-computer interaction. Even devices implanted into humans and/or animals can enable that human/animal to be part of an IoT.

The term "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

The terms "microservice" or "microservices" refers to collections of loosely coupled, fine-grained and parallelized services implementing lightweight protocols. Microservices can refer to a suite of small services for an application, with each microservice executing its own process and communicating with lightweight mechanisms that use relatively small amounts of computer resources.

Before describing in detail, the particular improved systems, devices, and methods, it should be observed that the concepts disclosed herein include but are not limited to a novel structural combination of software, components, and/ or circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

As noted previously, known chaos engineering products are dependent on manually configuring and maintaining chaos policies that define how the chaos experiments and testing is to be conducted. Relying on manual configuration and maintenance of such policies presents a number of problems. As noted previously, manual configuration is subject to human biases and fallacies, and, when it comes to estimating the type and magnitude of chaos, chaos engines can be also prone to human biases and fallacies. The problem of human bias was described rather eloquently in Nasim Nicolas Taleb's book Antifragile. In the book, Taleb discusses how nature constantly demonstrates anti-fragility—for example, when a human lifts weights his or her body ends up adapting to lifting higher weights than what the person already had lifted the previous few times. However, for human-built systems, there can be a tendency to focus on and live in the past, fighting the 'last war'-so, for example, humans building a nuclear power plant may tend to build one that can withstand the worst earthquake the humans seen to date. This is a fundamental fallacy because the earthquake before the most recent one may have been significantly lower and the next earthquake coming may be significantly higher.

This fallacy of fighting the 'last war' is particularly predominant in the world of chaos engineering, where administrators often just look at the last issue that happened in production (e.g., latency delay of 1 second) and try to reproduce the last chaos, believing that that would be the worse the system would see in future. The present infrastructure, for example, may have historically seen a worst latency of 1 second, so it is natural for a team to assume a latency delay of 1 second (or worst-case scenario) 2 second and test for that. However, when the infrastructure team works on changing the underlying infrastructure, the new infrastructure may have better performance generally speaking but may result in occasional outages of over 5 seconds. Since the DevOps team may focus only on the "last" performance it becomes incredibly difficult for DevOps to imagine how big future outages can be.

A further issue is focus on "today's problem instead of "tomorrow's" issues. The idea of manually hunting for exceptions and errors in production also has its own downsides and is susceptible to human biases, because issues like long tails (features used by only a few customers) and recurring exceptions (unexpected behavior that occurs, repeatedly, during software execution), are often caught and bubble up in logging dashboards like Splunk. When these issues happen, an entire software development team may be busy focusing on such long tails and recurring exceptions. These types of exceptions are ones that a software team already is aware of and working on fixing; but not truly the exceptions that will cause most issues and read chaos in production in the future.

Yet another issue is survivor bias (similar to the World War 2 plane example discussed previously). In an ideal environment, a chaos engine fundamentally may focus on spotlighting the kind of hidden issues that exist in the system that have not yet blown out of proportion. This is analogous to the survivor bias and confirmation bias—e.g., in World War 2 the entire focus was on looking at planes that returned from war and analyzing where they were hit to strengthen those areas, as noted previously. Issues such as survivor bias have solid implications in the field of chaos engineering and finding ways of estimating the chaos. Survivor bias is also particularly pertinent in the field of manually configuring chaos. While the recurring exceptions and longtails of today prepare the team for issues that are happening in production right now, these problems say nothing about issues that will happen in the future. That is, the significant problems of today are showing up in the logs as small occurrences and clusters of issues, not unlike the "unhit" areas in the airplane discussed above (i.e., the areas without holes)), which issues may blow out of proportion tomorrow as more users are onboarded on the system, as a feature is made available to more users, and/or as the underlying infrastructure changes are rolled out to a larger group. Seemingly minor issues of today often can become major problems of tomorrow. It is advantageous for a chaos engine to be able to wreak chaos and force the development team to embrace not just the chaos of today but the potential chaos of tomorrow, which can usually not be guessed manually because of the various human biases described above.

A further issue is that problems often start out small and become big and significant when left ignored. Even if DevOps and log monitoring teams) teams were to practice manual mindfulness in overcoming the above-listed biases (e.g., survivor bias), the presence of potential issues of tomorrow in the log often is so small that the issues are not likely to "bubble up" as long tails on the Splunk dashboards or monitoring dashboards and, hence, such issues and problems will never get proper attention that they deserve from the teams that might be manually configuring these chaos policies.

Yet another issue is that constantly changing infrastructure and evolving platforms make chaos prediction difficult. In environments where the underlying software and/or hardware infrastructure is subject to constant change and reconfiguration (even including constantly changing network paths and routing, different backup paths, etc.), this can mean that any chaos policy configured today may be rendered completely ineffective tomorrow. Thus, DevOps and/ or log monitoring teams may need to constantly update chaos policies manually, which is time consuming and costly. Moreover, because modern day micro services are built using multiple reusable components, nuggets, libraries etc., each upgrade of every library or other component can lead to new and novel chaos in the system. Trying to predict this manually is very challenging.

Consider a hypothetical example of a third-party logging framework that introduced a system issue three months ago. In response, a software development team applied a patch provided by the vendor and moved on. However, the possibility of the same issue or similar issue being introduced when the team upgrades to a new version of the same framework always exists in future. When these log clusters appear in the log (even if they are small clusters), it can be difficult to determine that they are concerning issues. However, in the embodiments discussed further herein, an intelligent anomaly detection system can use classification algorithms like Logistic Regression, Random Forest Classifier, Decision Tree Classifier etc. to classify such log clusters as a potential chaos if the log threshold scores above a certain value. Then, in accordance with further embodiments herein, once the item is flagged as a potential chaos, the item is simulated periodically using round robin allocation that is triggered based on log changes—for example, as a change in the version number of the logging framework inside the logged outputs. Because changes in infrastructure, underlying frameworks, and/or platforms can render old chaos policies completely useless, there is a need for at least some embodiments herein, which advantageously provide arrangements that automatically update these chaos policies (e.g., sets of chaos policies) to keep them fresh and updated.

An even further issue arises because not all environments are created equal: Issues in the real world occur based on underlying environment and sometimes even data parameters. These issues often may be the hardest to reproduce and catch. For example, consider tiny validation errors in a parameter such an "age" field, which field allows a user to enter a text value. While most users enter their age using numerical characters, which the field is designed to expect, it is possible that a given user might instead enter a non-numeric character, a particular user enters some text value which results in detectable exceptions or errors logs being generated in the production or operating environment. While this log may never bubble up as a long tail, such a typecast error is an indicator that the validations for that specific form have not been done effectively. As a solution, in some embodiments, it can be possible to introduce a deliberate magnification/bias for this specific category of errors (as discussed further herein), so that it is possible to amplify such errors in the development environment, which may compel development teams to further tighten the validation of that specific form. Thus, at least some embodiments herein also can help to test for such "functioning" weaknesses in a design as well as to test for potential and/or actual failures that can bring down operation of an application or system.

Also, because each environment is different, errors that happen in one environment (say for example UAT) may not happen in another (PERF or production (PROD)). If the chaos engineering team is looking at a specific environment and, for example, only looking at long tail errors, the chaos engineering team may have very limited view of errors that might happen in the entire system. Being able to capture these errors that happen in one environment (e.g., PERF) and to reproduce them in another (DEV), in accordance with some embodiments herein, gives the development team a chance to build much more resilient systems. Advantageously, providing at least some embodiments herein that are configured to do this automatically can mean that chaos polices also are updated automatically based on all environments. This helps to ensure, for example, that when infrastructure changes are tried out in UAT, the systems are already resilient to the issues those infrastructure changes might cause by the time the infrastructure changes are rolled out to production.

Still another issue is that not all chaos happens all the time, yet all chaos needs regression. For example, assume the existence of a particular kind of chaos, such as, SQL Connection time out errors that happen when the database administrator changes the password of the service account. Ideally this error would happen if the team has hard coded the connection string in a particular micro service. Thus, when this error occurs, the team typically focuses on externalizing this configuration and fixing the error. Rarely does the team think about building resilience around this error (e.g., using a fallback data store/cache when the database is not available). An automated smart chaos configuration engine, as provided in at least some embodiments herein, can be configured to address this issue, such as by selecting tiny clusters of these kinds of errors when they occur and randomly start amplifying and injecting these kinds of errors (i.e., SQL Connection timeout errors) when it sees even small occurrences of such errors in production. This type of mechanism can help compel development teams to build resilience and think about what happens when other database outages occur.

In some further embodiments, assuming that the team has built this fix/resilience into their product, the chaos policy that tested for this issue ought to be removed from the configuration. However, it is possible that in the near future (e.g., a few weeks/months from now), there might be other teams who build other features, where the other teams and/or other features do not take the aforementioned fix/resilience (for the SQL error) into account. As a result, there is a need to:

(1) Understand that a particular error can have multiple root causes;

(2) Simulate the generation of that kind of error without worrying about the cause and forcing the teams to build resilience;

(3) Remove the policy automatically, once the resilience is built; and (4) Reapply the policy from time to time that the resilience is still intact and again remove the policy after a brief that that the resilience is intact.

All of the above (1) through (4) advantageously, in certain embodiments, happens dynamically, on the fly (e.g., in real time) and in a fully automated fashion without any human intervention. Otherwise, (1) through (4) can, if done manually can translate into multiple man-days of work, countless misses by humans doing changes manually, and high dollar amounts just spent in regression resilience tests.

At least some embodiments herein provide a chaos engine that can self-configure its set of chaos policies which mirror real-world chaos happening in the production environment, in real-time, multiply it by a magnitude, and then propagate that chaos to stages like systems integration testing (SIT)/performance testing (PERF) Stage and other test or development environment (e.g., user acceptance testing (UAT), thereby automatically highlighting issues and allowing the teams to 'embrace chaos' in its truest spirit. Advantageously, at least some embodiments are smart enough to not just add new chaos policies to the set of chaos policies but also remove chaos policies that have been injected, from the set of chaos policies, by automatically figuring out that the teams have built resilience and, therefore, that the specific type of chaos is no longer relevant. The same approach, in some embodiments, uses either or both of machine learning based and regular round robin-based approaches to perform automatic regression on specific chaos types.

One advantage of at least some embodiments of the self-configuring chaos engine, as discussed herein, means a significant reduction in time spent configuring complicated chaos policies/rules. This translates into saving hours of time and money for the engineering and development operations (DevOps) teams. Additional advantages of at least some embodiments herein includes making the overall chaos engineering process much more anti-fragile and helping to remove human the biases and optimism out of chaos configuration, while at the same time helping to fully automate making the tedious task of continuously tweaking chaos policies based on ever-changing environment. In certain aspects, an auto-configuring component is provided that can work with multiple types of chaos engines, where the auto-configuring component is able to:

1. Monitor issues in the production environment as they happen in near real-time.
2. Generalize those issues and intelligently group those into higher levels or errors.
3. Magnify the magnitude of these chaos types and push them into UAT, PERF, and the development environment so that the development team is forced to embrace this real-world chaos and make sure their next release is resilient enough to handle those issues.
4. Intelligently understand when the team has built resilience for the chaos produced and remove these chaos policies automatically from the configuration.
5. Automatically perform regression on different kinds of chaos from time to time to see if a chaos that had happened in the past and for which resilience had been developed, has again developed the potential of becoming a problem.

At least some embodiments that provide for #1-5 above are advantageous for chaos engineering because they provide an environment where there is, essentially, no more need to manually configure any chaos experiments or policies by hand. Instead, use of the Self-Configuring Chaos Engine System (e.g., as discussed further herein in connection with FIGS. 2-8), as provided in at least some embodiments herein, helps to give the chaos engines a life of their own, allowing a "Set and Forget" configuration that then evolves automatically and intelligently. As new issues happen in production, the chaos engine of the Self-Configuring Chaos Engine System develops intelligence and becomes smarter over time to not just inject chaos, but also remove chaos, and perform regression chaos tests by using different kinds of chaos in different environments.

Thus, in certain embodiments, the chaos engine of the Self-Configuring Chaos Engine System constantly learns from the issues that are happening in production, learns to mix and match those issues, group those issues, and magnify their magnitude or importance before it pushes them to UAT and development environments. Once the team develops resilience the chaos engine also understands that chaos testing for that specific kind of chaos might be a waste of time and thus it also silently removes that chaos policy and moves it to a regression queue so that it can reapply it after weeks/months to test for regression. And it does all this without requiring any added manual configuration.

FIG. 2 is an illustration of an exemplary information processing system 200 that includes a Self-Configuring Chaos Engine System 300 in accordance with one embodiment. The information processing system 200 includes a plurality of entities communicating over a computer network 108 with a back end system 210, where the back end system includes the Self-Configuring Chaos Engine System 300 (discussed further herein) as well as, in certain embodiments, an optional anomaly detection and resolution platform 212. There are a plurality of host devices 202A-202N, a plurality of user devices 204A-204N, a plurality of respective microservice 206A-206N running on the plurality of host devices 202A-202N, sets of platforms and service 351 (e.g., PaaS, SaaS, IaaS, etc.) all communicating over a computer network 208 with the back end system 210.

In the back end system 210, the optional anomaly detection and resolution platform 212 is configured to help detect anomalies during operation, including but not limited to anomalies in microservices, wherein information about these anomalies is usable by the Self-Configuring Chaos Engine System 300, as discussed further herein. In certain embodiments, the optional anomaly detection and resolution platform 212 can be implemented in accordance with teachings in any one or more of the following commonly assigned U.S. patent documents, which are hereby incorporated by reference:

U.S. Pat. No. 9,898,604, entitled "Dynamic graph anomaly detection framework and scalable system architecture," issued on Feb. 20, 2018;

U.S. Pat. No. 10,824,726, entitled "Container anomaly detection using container profiles," issued on Nov. 3, 2020;

U.S. Pat. No. 10,936,717, entitled "Monitoring containers running on container host devices for detection of anomalies in current container behavior," issued on Mar. 2, 2021;

U.S. Pat. No. 11,356,324, entitled "Chaos engineering in microservices using a service mesh," issued on Jun. 7, 2022;

U.S. Pat. No. 11,361,197, entitled "Anomaly detection in time-series data using state inference and machine learning," issued on Jun. 14, 2022;

U.S. Pat. No. 11,513,935, entitled "System and method for detecting anomalies by discovering sequences in log entries," issued on Nov. 29, 2022;

U.S. patent application Ser. No. 17/943,190, entitled "Data Driven Chaos Engineering Based on Service Mesh and Organizational Chart," and published as U.S. Publ. No. 2022/0286362 on Sep. 9, 2022;

U.S. patent application Ser. No. 17/722,109, entitled "Method and system for performing anomaly detection in a distributed multi-tiered computing environment," filed on Apr. 15, 2022, and published as U.S. Publ. No. 2023/0333903 on Oct. 19, 2023; and U.S. patent application Ser. No. 18/473,410 entitled "Microservices Anomaly Detection and Control of Logging Operations," filed on Sep. 25, 2023.

Referring again to FIG. 2, the Self-Configuring Chaos Engine System 300, in certain embodiments, provides the ability to work with any commercially available chaos engine to create controlled chaotic URLs centrally. As discussed further herein, the Self-Configuring Chaos Engine System 300 includes a Log Stream Analyzer 302, a Priority Assigner 304, a Magnifier 306, a Policy Composer 308, a Feedback Monitor 362, a Hot Reloader 376 (also referred to herein as engine hot loader 376), a Chaos Engine 380, and an Automatically Configured Set of Chaos Polices 382. In certain embodiments, the Self-Configuring Chaos Engine System 300 can automatically configure, automatically change, and automatically tweak chaos policies, using continuous and real-time monitoring of the production events and logs. In certain embodiments, the Self-Configuring Chaos Engine System 300 includes an optional user interface 363 accessible to one or more users 365 of the computer network 208.

Figure 3:
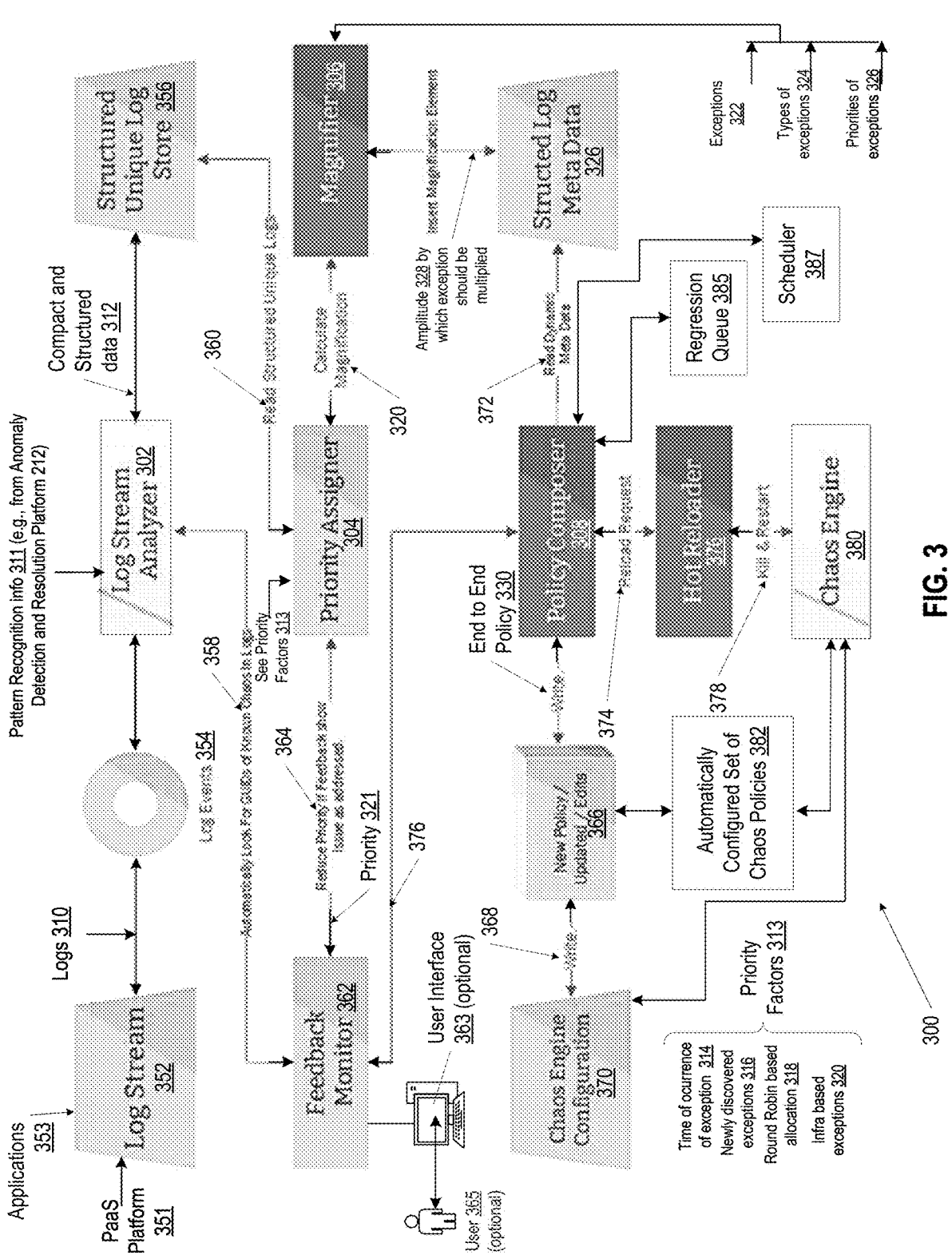
FIG. 3 is a simplified block diagram illustrating the high level design of the Self-Configuring Chaos Engine System of FIG. 2, in greater detail, in accordance with one embodiment.

FIG. 3 is a first simplified block diagram illustrating a high level design of the Self-Configuring Chaos Engine System 300 of FIG. 2 in greater detail, in accordance with one embodiment. Referring to FIGS. 2-3, the following describes the components that help to make the Self-Configuring Chaos Engine System 300 possible.

The Log stream Analyzer 302 reads information from a Log Stream 352, including Logs 310 from applications 353, Logs 310 from underlying services 351 (e.g., PaaS platforms) that are being streamed to Splunk, as well as other Logs 310 and log events 354. In certain embodiments, the Log Stream 352 includes information regarding the operation of one or more components that are operating or running in (or are in operable communication with) the information handling system 200, for example. The Log Stream Analyzer 302 analyzes all of these inputs and turns them into a grouping of compact and structured data 312, which is stored in a structured unique log store 356. The compact and structured data 312 is a type of grouping that is stored in the structured unique log store 356 and is accessible to the Priority Assigner 304, which reads the structured unique log information (reference #360 in FIG. 3).

This compact and structured data 312 is then analyzed, in the Log Stream Analyzer 302, for specific clusters, groups, and categories. For example, the Log Stream Analyzer 302 can club (group) all latency long tails alerts of more than 1 second and club them into a grouping comprising one specific latency exception for a particular application. The Log Stream Analyzer 302, in certain embodiments, is configured to group together issues it detects in the Log Stream 352 bases on various factors, such as whether an issue is detected matches a predetermined characteristic, whether what is detected has commonality with other detected issues, whether what is detected is determined (e.g., via the anomaly detection and resolution platform 212) to be an anomaly, etc. Similarly, even if the Log Stream Analyzer 302 just finds a couple of exceptions in connecting to the mail server (because the mail server was busy and later healed)—it still clubs that into one unique kind of error that can occur in the system. The Log Stream Analyzer 302 is thus converting long streams of log information into compact and structured data 312 that corresponds to a grouping of data that contains a unique list of all exceptions, errors, and issues that are happening in a production and/or operating environment. In at least some embodiments, the compact and structure data 312 can be grouped into subsets (e.g., other groupings) that are based on chaos types that can be injected into the system;

For anomaly detection and for collecting detailed logs and traces about anomalies, in certain embodiments, the Log Stream Analyzer 302 leverages outputs from the anomaly detection and resolution platform 212, such as pattern recognition information 311 that can be used to identify issues in the Log Stream 352. For example, in certain embodiments, the anomaly detection and resolution platform 212 is configured to use arrangements discussed in the aforementioned U.S. patent application Ser. No. 18/473,410 entitled, "Microservices Anomaly Detection and Control of Logging Operations," filed on Sep. 25, 2023 (hereinafter "'410 application"), which is incorporated by reference, where the '410 application discusses deep learning approaches to analyze logs and find anomalies, including patterns of anomalies.

The Priority Assigner 304, in certain embodiments, is the "heart" of the Self-Configuring Chaos Engine System 300. In contrast to an unintelligent system, in the Self-Configuring Chaos Engine System 300, in certain embodiments, it is not possible to simply assign a priority to a specific exception type based on the count of occurrence—because what is low in count today may become an issue tomorrow. This is why the Priority Assigner 304 advantageously is configured to work on a heuristic-based algorithm where it considers a set of priority factors 313 that the Priority Assigner 304 follows while assigning a priority to a specific kind of exception, where the set of priority factors 313, in certain embodiments, includes:

a) The time of occurrence of the exception 314—exceptions that occurred a week or month ago are given a lower priority compared to the ones that have recently happened.

b) Newly discovered exceptions 316—exceptions that have already been discovered and configured in the Chaos Engine 380 for a couple of releases get a much lower priority compared to newer exceptions. This provides a rotational nature in the configuration where either newly discovered exceptions exist in the system, or exceptions that have been fixed a long time ago (see point below) show up in the simulated chaos.

c) Round Robin Based Allocation 318—just because an exception was added to the chaos configuration and was fixed by the development team by making the system resilient enough to handle it does not mean that the same exception will not show up in a different situation. Thus, exceptions that have been configured in the chaos engine a long time ago are often brought to the front of the queue randomly to check if resiliency against them still exists in the system. This ensures that the configuration for the chaos engine is ever-evolving and not impacted by human biases; where we as humans either see issues in a binary state—i.e., either open or closed.

d Infrastructure ("Infra")-based exceptions 320—exceptions like latency, connection timeout, and connection failures that are rare occurrences are often an indicator of underlying hardware issues that can spiral out of proportion if attention is not drawn to them at the right time. Thus, all infra exceptions (e.g., SQL-Connection-Timeout, Socket exceptions, Network-related exceptions) are given a higher priority, even if they occur just once or twice in the system and self-heal.

The Magnifier 306 looks at exceptions, their type, and their priority to design the amplitude 328 by which the exception should be multiplied in the chaos experiments of the future. The Magnifier 306 also has an element of controlled randomness built into it to overcome any human basis of prediction. For example, a connection timeout with a mail server may have happened only twice recently, but, because it has a high priority, the Magnifier 306 may magnify the importance of this exception to anywhere between 15% to 30% of the calls made to the mail server, to make sure that the development team not just discovers this issue but also builds resilience around this issue. In certain embodiments, factors such as criticality can also be assigned based on the criticality of a specific feature. For example, a feature in an "FAQ" section of the website may have much lesser priority for magnification that an issue that occurs in the other sections, such as product catalog or the payment gateway. In the example of a given e-commerce website, such a website may function well for customers to use even if less critical features like "favorites" or "FAQ" are not working, but it may be critical that features such as "catalog," "shopping cart" and "payment" feature are always working. Thus, the Magnifier 306 can be configured, in certain embodiments, to ensure that even the slightest of errors that occur in whatever are deemed to be critical pathways of the application are caught, sufficiently amplified (described in detail further herein) and simulated in the development environment, forcing the teams to build a much more resilient system. In addition, in certain embodiments, the criticality of a given feature or type of exception may be determined by other factors, such as high execution count on a server, a high execution count associated with the critical function, the path on which it falls, etc. When the Self-Configuring Chaos Engine System 350 finds no such issues to magnify in the critical paths, in certain embodiments, the Self-Configuring Chaos Engine System 350 is configured to magnify issues in the other critical paths.

The Policy Composer 308 is the central orchestrator that takes inputs from the other components and orchestrates the process of generating an end-to-end policy 330 for a respective period. The Policy Composer 308 also modifies an (already configured) automatically configured set of chaos policies 382 with new policy updates/edits 366 to enforce round-robin-based swaps and other smart swaps described above. The automatically configured set of chaos policies 382 are usable set of to conduct chaos experiments on the system. For example, the automatically configured set of chaos policies 382, in certain embodiments, are usable by a chaos engine 380 (including any chaos engine 380 that is in operable communication with the information processing system 200 and/or with the Self-Configuring Chaos Engine System 300) to conduct one or more chaos experiments on the information processing system 200. Based on all the inputs, the Policy Composer 308 creates a chaos engine configuration 370 which is provided to the Chaos Engine 380. In addition, the Policy Composer 308, in certain embodiments, tracks in regression queue 385 the chaos for which resilience has been developed, where checks can be made to determine, via regression analysis, if the chaos has developed the potential to again become a problem. In certain embodiments, the regression queue 385 comprises information relating to one or more types of chaos for which there have been past respective chaos experiments, wherein based one or more results from one or more past chaos experiments, the information processing system 200 (or other entity being tested) has shown appropriate or acceptable resiliency. As discussed herein, the Self-Configuring Chaos Engine System 300, in certain embodiments, is configured to perform automatic regression analysis on one or more types of chaos, including removed chaos, that are in the regression queue 385, where the regression analysis can happen based on various factors, including elapse of a predetermined or computed time period, randomly, occurrence of a predetermined event (e.g., if predetermined error or other exception takes place), etc., as discussed herein. In certain embodiments, the automatic regression analysis can take place based on the one or more priority factors 313 discussed herein. In addition, the Self-Configuring Chaos Engine System 300, in certain embodiments, uses a scheduler 387 to help determine when and how frequently an entity (e.g., including but not limited to, a component, module, service, microservice, application, feature, etc.)

The Feedback Monitor 362 (also referred to herein as Feedback Loop Engine 362), in certain embodiments, helps to track the resiliency systems, services, etc., being monitored and/or tested via the Self-Configuring Chaos Engine System 300 and helps to track how resilient a given entity is against a particular exception, including learning when developers have provided resiliency. As an example, as different chaos types are injected into the UAT/Development/Chaos environments of specific microservices, a list of unique exceptions in the current cycle is marked as active. Each respective unique exception has a unique globally unique identifier (GUID) that is also injected into a stack trace (report of the computer's internal processing operations) associated with the execution of a given process that is running. For example, in certain embodiments, as shown in FIG. 3, the Feedback Monitor 362 automatically looks for GUIDs of known chaos (Ref #358 in FIG. 3) in logs being analyzed in the Log Stream Analyzer 302. Thus, when a client application or a dependency fails because of that exception, the GUID also flows to the stack trace of the dependency. This allows the Feedback Monitor 362 to track how resilient a given system is against a specific kind of exception, e.g., against known types of chaos.

That is, while the Log Stream Analyzer 302 is analyzing exceptions, the Feedback Monitor 362 also looks for known currently active GUIDs in unrelated exceptions (e.g., in the logs), and if these GUIDs show up there, it indicates that the system being tested is not resilient against the errors. As these GUIDs stop showing up in the unrelated exceptions, the Feedback Monitor 362 thus understands that the developers have introduced resilience, and, therefore, the Feedback Monitor 362 is configured to silently lowers the priority of the exception. The Feedback Monitor 362 then moves the lowered-priority exception out to be injected (as chaos) at a later date. In certain embodiments, an optional user interface (UI) 363, accessible to one or more users 365, is provided for developers to provide this feedback loop manually, but this is not necessary, as the system is a Self-Configuring Chaos Engine System 300. In certain embodiments, it is advantageous if the Self-Configuring Chaos Engine System 300 is intelligent enough to complete the feedback loop by itself based primarily or solely on the logs and data available.

The Hot Reloader 376 (also referred to herein as "Engine Hot Loader"), in certain embodiments, is configured to be able to restart the Chaos Engine 380 automatically if there are automatic configuration changes in the Self-Configuring Chaos Engine System 300. For example, in certain embodiments, the Hot Reloader 376 is configured to restart the Chaos Engine 380 automatically if it detects any changes in the automatically configured set of chaos policies 382. In certain embodiments, the Self-Configuring Chaos Engine System 300 has support for automatically updating the simulated chaos if a new configuration is injected into the configuration, to help ensure that the new configuration of the chaos policy automatically kicks in and that the new chaos can be injected automatically. However, as will be appreciated by those of skill in the art, in the real world, multiple chaos engines 380 may exist that require a restart when the underlying configuration is injected. The Hot Reloader 376 monitors the configuration changes based on the files being watched and automatically restarts (see reference #378 "Kill & Restart" in FIG. 3) the underlying Chaos Engine 380 if the Chaos Engine 380 requires a reboot to load the newly modified configuration.

As discussed herein, at least some embodiments provide systems, methods, and/or devices that are configured to provide an arrangement wherein there can be smart and automatic configuration of any chaos engine, using polices that are created automatically. For example, referring to FIGS. 2-3, the Chaos Engine 380 is automatically config-ured, using the embodiments discussed herein, to create random faults in the operation of the information processing system 200 (FIG. 2) to test its resiliency in the face of those faults. In certain embodiments, the systems, methods, and devices of the embodiments herein automatically configure the Chaos Engine 380 to choose and prioritize the faults to create in accordance with an automatically configured set of chaos policies 382. In certain embodiments, as noted pre-viously, the systems, methods, and devices of the embodi-ments herein ensure that the Chaos Engine 380 constantly learns from the issues that are happening in production (via information from the Log Stream 352 and/or the Feedback Monitor 362), learns to mix and match those issues (via Policy Composer 308), group those issues (via the Log Stream Analyzer 302), prioritize those issues (via Priority Assigner 304) and magnify their magnitude or importance (via Magnifier 306) before it pushes them to UAT and development environments, and in certain embodiments is configured to automatically update the chaos pushed out (via Hot Reloader 376) if the underlying configuration changes. Furthermore, once the team develops resilience, the systems, methods, and devices of the embodiments herein ensure that the Chaos Engine 380 also learns and understands (via Feedback Monitor 362) that chaos testing for that specific kind of chaos is not necessary or a priority at the present time (because resilience for it is provided), so the Chaos Engine 380, via Policy Composer 308, silently/invisibly and auto-matically removes, from the automatically configured set of chaos policies 382, the chaos policy that is applicable to that kind of chaos, and, optionally, moves that chaos to a regression queue 385 (also referred to herein as reinspection queue 385), so that the Chaos Engine 380 can reapply the removed chaos policy after weeks/months (or via any sched-ule or time as determined by scheduler 387) to test for regression. Advantageously, the components discussed above in connection with FIG. 3, enable the Chaos Engine 380 to do all this without requiring any added manual configuration.

Figure 4:
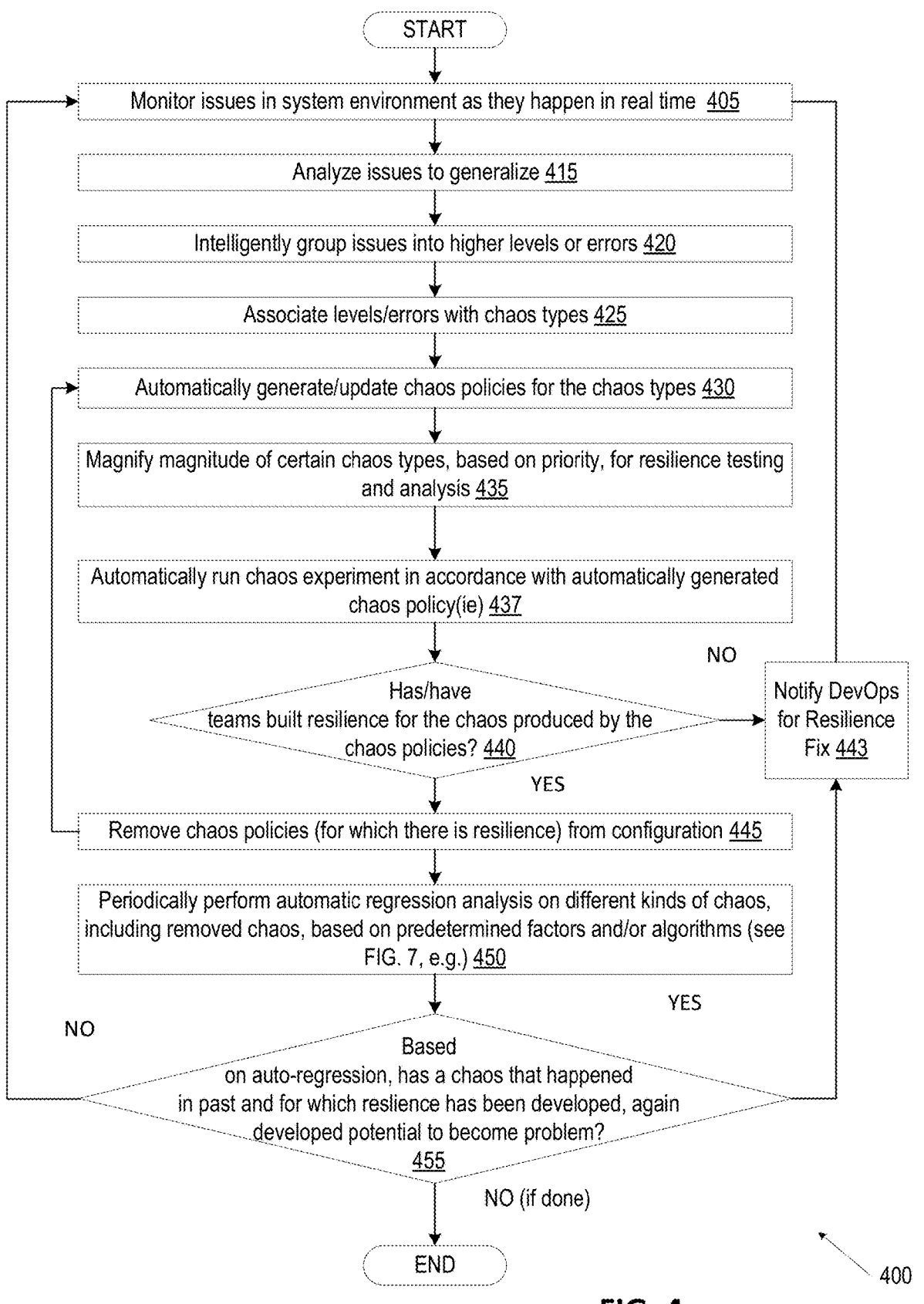
FIG. 4 is a flowchart of a first method of configuring a chaos policy, usable in connection with the Self-Configuring Chaos Engine System of FIGS. 2-3, in accordance with one embodiment.

FIG. 4 is a flowchart 400 of a first method of configuring a chaos policy, usable in connection with the Self-Config-uring Chaos Engine System 300 of FIGS. 2-3, in accordance with one embodiment. Referring to FIG. 4, issues in a system environment (e.g., the information processing sys-tem 200 of FIG. 2) are monitored as they happen in real time (block 405), such as via the Log Stream 352, and issues are analyzed to generalize (block 415) and turn into compact and structured data 312, e.g. via Log Stream Analyzer 302. Issues are intelligently grouped into groupings based on higher levels or errors (block 420), e.g., via the Log Stream Analyzer 203. The levels and/or errors are associated with types of chaos (block 425) and chaos policies for the chaos types are automatically generated (or updated, if applicable (block 430), e.g., via Policy Composer 308. The chaos policy(ies) generated are usable to configure the Chaos Engine 380 to run one or more chaos experiments. For example, the automatically configured set of chaos policies 382 are usable, e.g., by the chaos engine 380, to conduct chaos experiments on the information system 200. In certain embodiments, based on priority (e.g., as set in Priority Assigner 304), the chaos policy(ies) may be configured so that certain chaos types have their magnitude magnified (e.g., via Magnifier 306) for resilience testing and analysis (block 435). These chaos types thus will be pushed into the PERF, UAT, and development environments, for resilience testing. In block 437, one or more chaos experiments are run automatically in accordance with the automatically generated/updated chaos policy(ies) that were generated in block 430. Based on one or more results of the one or more chaos experiments, checks are made, e.g., via Feedback Monitor 362, to determine whether the development teams have built resilience into their systems, for the chaos produced by the chaos policies (block 440). If the answer at block 440 is NO, then a notification is made to the DevOps team that a resilience fix is needed (block 443) and processing returns to block 405 to continue to monitor issues.

If the answer at block 440 is YES, then processing moves to block 445, to remove the chaos policies for which there is resilience, from the configuration (e.g., via Policy Com-poser 308 and New Policy/updates/edits 366). During the process, automatic regression analysis is performed periodi-cally on different kinds of chaos, including the removed chaos, based on predetermined factors and/or analysis (block 450) to verify resilience remains. In certain embodi-ments, the automatic regression can be performed upon occurrence of a predetermined issue, such as a configuration change. In certain embodiments, the analysis of block 450 is based on one or more predetermined factors or algorithms may be run, to help determine when the automatic regression takes place. This is discussed further herein in connection with FIGS. 6-7.

Based on the automatic regression analysis of block 450, a check is made in block 455 (e.g., via Feedback Monitor 362) to see whether a chaos that happened in the past, and for which resilience was developed, again has developed a potential to become a problem (block 455). If the answer at block 455 is NO, then processing moves to block 405 to continue monitoring for issues. If the answer at block 455 is YES, then processing returns to block 443, to notify the DevOps team (so that a fix can be implemented and then monitoring at block 405 can continue). If the answer at block 455 is NO, then processing either can continue to return back to block 405, or can end, if the chaos testing is complete.

One of the advantages of automatic chaos, as discussed herein, is that issues that happen in the critical flows of the application can be amplified (e.g., via Magnifier 306) in terms of the chaos that is introduced into the system. Critical flows in a given application can be identified using two aspects. In a first aspect, critical flows can be indicated by the development teams or product owners using specific class names and function names in the configuration as a key value pair. In a second aspect, critical flows can be indicated by identifying classes and functions with highest execution count on the server. In either of these aspects, the result, in certain embodiments, is a dictionary of classes and function that form critical flows of the given application. To discover if an anomaly falls in the critical path, in certain embodi-ments, the anomaly logs are retrieved, trace information for that anomaly is collected, and checks are made to look for existence of the class name and function name (that form the critical flow(s)) in the stack trace or anomaly trace. As noted previously, in certain embodiments, teachings in the afore-mentioned '410 application are usable to help implement a smart anomaly detection engine using deep learning algo-rithms. However, the embodiments herein are usable with any anomaly detection arrangement, as will be appreciated.

Figure 5:
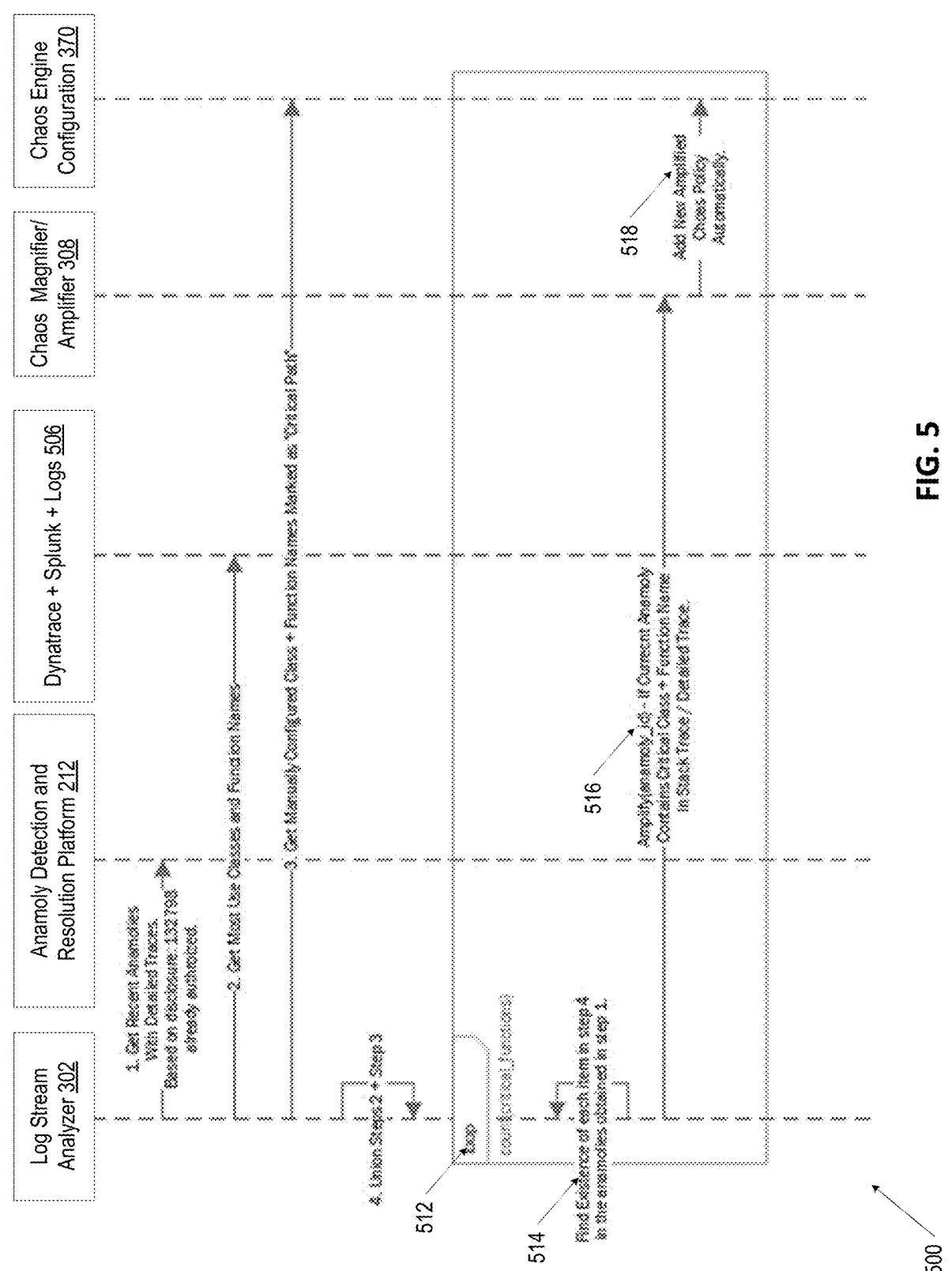
FIG. 5 is a first flow diagram illustrating how amplification of an anomaly in a critical path takes place in the Self-Configuring Chaos Engine System of FIGS. 2-3, in accordance with one embodiment.

Once the anomaly traces are dynamically picked, the traces are checked to look for specific substrings, and, if the critical class+function occurrence is found in the stack trace, the anomaly is considered to fall in the critical path. FIG. 5 is a first flow diagram 500 illustrating how amplification of an anomaly in a critical path takes place in the Self-Configuring Chaos Engine System of FIGS. 2-3, in accordance with one embodiment. The first flow diagram 500 illustrates the sequence of how the Magnifier 306 (also referred to herein as "amplifier") identifies that the anomaly has occurred in the critical path so that it can amplify it even more than other anomalies that happen in the regular path.

Referring to FIG. 5, at step 1, the Log Stream Analyzer 302 gets recent anomalies with detailed traces from the anomaly detection and resolution platform 212 (e.g., via an anomaly detection system such as that described in the '410 application). At step 2, the Log Stream Analyzer 302 gets most use classes and function names from the Log Stream 352, such as from functions like Dynatrace+Splunk+Logs 506. In step 3, the Log Stream Analyzer 302 gets manually and/or automatically configured class and function names that are marked as (or determined to be) "critical path" from information associated with the chaos engine configuration 370. In step 4, the combination/union of steps 2 and 3 are repeated/looped 512 at the Log Stream Analyzer 302, until all critical functions are counted, which is recorded as a variable count_critical_functions. At reference #514 in FIG. 5, in each loop 512, the existence of each item in step 4 (i.e., the existence of each manually and/or automatically configured class and function names marked as "critical path) is searched for in the anomalies obtained in step 1.

At reference #516 in FIG. 5, a given anomaly_id is amplified (via Magnifier 306) if the current anomaly contains a critical class+function name in its stack trace/detailed trace. This amplified anomaly is automatically added to a new amplified chaos policy (e.g., within the automatically configured set of chaos policies 382) at reference number 518 in FIG. 5. In certain embodiments, even though automated regression is performed for all chaos policies, for anomalies happening in in the critical path, such anomalies can be further added to the chaos scheduler (which operates in coordination with the regression queue 385) to do much more frequent automated regression which will be described further below. In certain embodiments, the regression queue 385 defines what entity (e.g., a service, feature, component, module, process, etc.) needs to be constantly retested (e.g., via regression), and the scheduler decides when and how frequently the entity needs to be retested.

Figure 6:
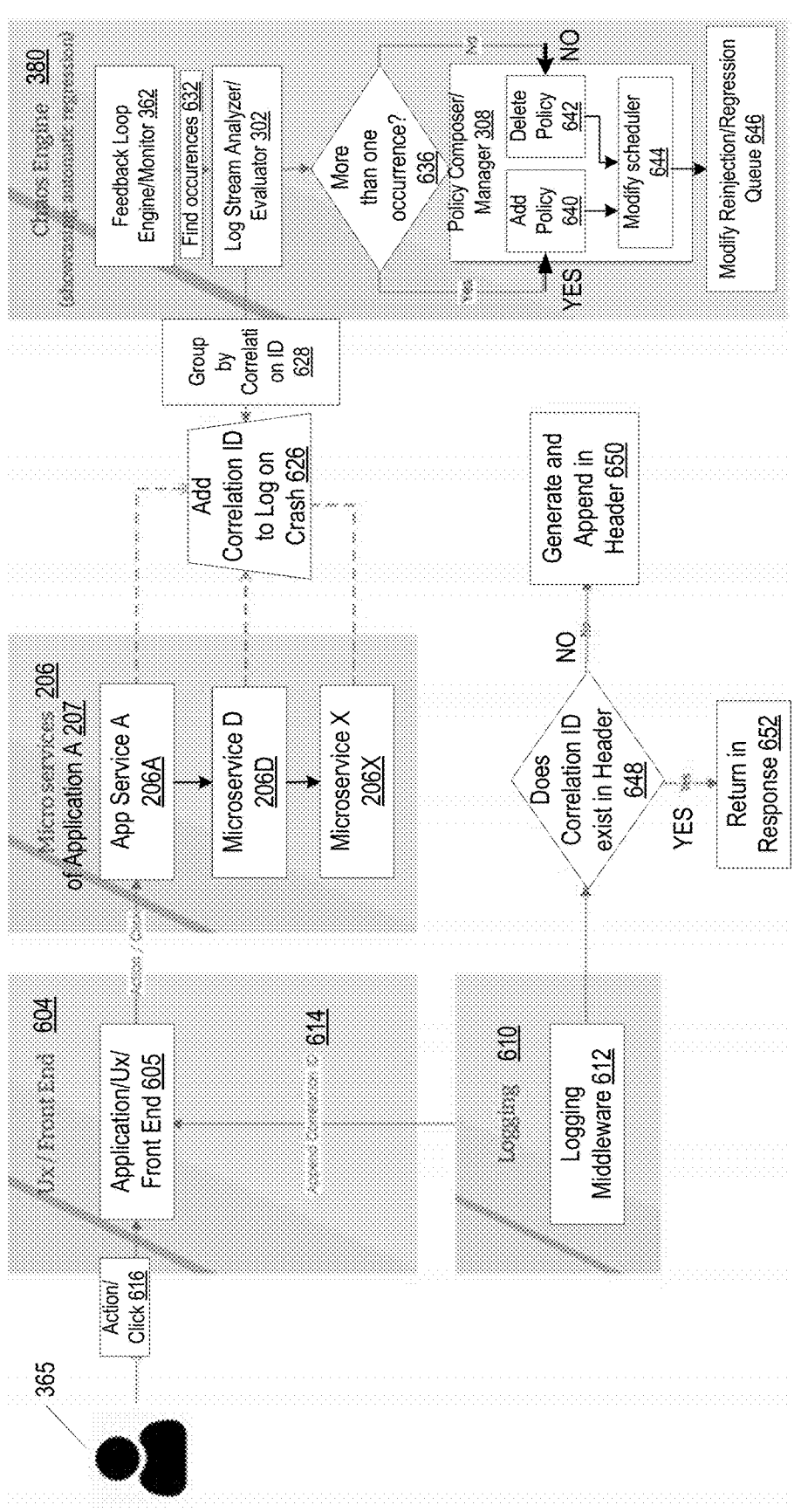
FIG. 6 is a second flow diagram illustrating operation of a feedback loop operation and automatic regression, in the Self-Configuring Chaos Engine System of FIGS. 2-3, in accordance with one embodiment.

The Feedback Loop and Automated Chaos Regression analysis are now further described. In the discussion above, the Feedback Monitor 362 (also known as a feedback loop engine) was described as an important component for helping to ensure that chaos policies are not just injected but they are automatically removed when they are no longer needed and again reloaded from time to time to do regression tests for resilience. The design of FIG. 6, discussed further below, helps showcase how this works. In particular, FIG. 6 is a second flow diagram 600 illustrating operation of a feedback loop operation and automatic regression, in the Self-Configuring Chaos Engine System of FIGS. 2-3, in accordance with one embodiment.

As showcased by the second flow diagram 600, a user 365 interacts with a User Experience (UX)/front end 604, such as via an optional user interface 363 (FIG. 3), where the user performs an action/click 616 to the application/UX front end 605 of a given application, such as Application A 207. These interactions are subject to logging 610, such as via logging middleware 612. Each calling application, such as Application A 207, may be running a plurality of microservices 206, such as App Service A 206A. In some embodiments, these microservices 206 may themselves be configured to call other microservices. For example, in FIG. 6, App Service A 206A may be configured to call Microservice D 206D, which in turn calls Microservice X 206X. In the example of FIG. 6, each calling application appends a correlation identifier (correlation ID) in its header (reference #614 in FIG. 6). In certain embodiments, a correlation ID is a unique value (usually a GUID). Each micro service first checks to see if the HTTP Header that they receive in the request object has a correlation ID (block 648) and if they find one, they append the same correlation ID in their own header and return it in response (block 652), before they call downstream systems. If an HTTP header is not found, then the correlation ID is generated and appended into the header (block 650). Thus, when the call reaches the service where the chaos is introduced and the service crashes, the correlation ID will be logged, e.g. as noted at block 626 ("Add Correlation ID to Log on Crash"). As the chaos bubbles upstream to the calling services, if the calling services do not have resilience built in, and the calling services crash, the same correlation ID will also be logged against those crashes.

Thus, assuming, in the above example, if there is no resilience and bad error handling in the system for the same correlation ID, then three crashes would result: one for App Service A 206A; one for Microservice D 206D, and one for Microservice X 206X. If this happens, it safely can be assumed that the team has not built resilience yet into the application that calls the Microservices 206 (and/or into the Microservices 206), and so there is a need to continue amplifying the error message. If, however, the arrangement finds only 1 occurrence (or N occurrences if the planned blast perimeter for the chaos is N services) of the correlation ID and that, too, only in the injected chaos instance, it can safely be assumed that the injected chaos is only causing the targeted service (or the targeted blast perimeter) to crash but does not have unintended side effects. In that latter instance where the injected chaos only causes targeted service to crash, but not others, it can be concluded that the team has built sufficient resilience.

In this situation, it means that the injected chaos (which only caused the targeted service to crash, but not others) is now "safe" to remove, automatically and intelligently, from the automatically configured set of chaos policies 382 that are being used, and that there is no further point or reason in continuing to test it. However, the same error (from that injected chaos) possibly might show up in the future. Thus, depending on the count of correlation IDs that existed before the count of correlation IDs went to zero, the previously injected, but removed chaos can be injected in the "reinjection queue" 385 (also referred to herein as the regression queue 385), for later reinjections into the chaos, in accordance with timing and/or intervals defined, in some embodiments, by scheduler 387. However, in this example, scheduling of the reinjection of that chaos is done, via scheduler 387, based on the occurrences of correlation ID before the resilience was built. For example, if a chaos had broken 20 services, and all 20 now have resilience built, there may be a need to regress the chaos by reinjecting it again rather quickly (i.e., in the near future). However, if a chaos had just caused one service to fail and now the resilience has been built, the engine can wait a longer duration (e.g., a month) before it reschedules the same regression.

In certain embodiments, there is a methodology and algorithm to help perform the automatic regression analysis to determine which chaos types to reinject and how long to wait to reinject them. The methodology and algorithm can vary based on the application. In some embodiments, the Priority Assigner 304 can help the automatic regression analysis, such as via the aforementioned heuristic-based algorithm to assign priority to injections. For example, in the aforementioned Round Robin Based Allocation, exceptions/ anomalies that were configured in the Chaos Engine 380 a "long time" ago can be brought randomly to front of the queue for chaos injection, to see if resiliency still exists in the system for those exceptions/anomalies.

In some embodiments, the automated chaos regression takes into account application-specific factors to help determine the timing of injecting chaos. For example, for a given type of chaos, exemplary factors considered are the number of microservices impacted. Priority, days since the first impact, days since the second to last impact, and days since the last impact. If there is an assumption, for an example, an "impact gap" (number of days between the second to last impact and the last impact, of an issue, failure, or problem in the entity being tested) of 60 days. Also, assume that this impact gap can be scaled up or down based other factors, such as priority or number of microservices impact, as will be understood, to help determine when to next modify a chaos policy. For example, an exemplary impact gap of 60 days can be scaled (e.g., via scheduler 387) to 42 days, in accordance with a predetermined priority factor or an "on the fly" computed priority factor. Thus, example scaling can be interpreted that, based on the last impact, there is not a need to automatically modify a given chaos policy to inject the chaos associated with these impacts, as a regression, for another 42 days. Then, after 42 days, if the issue is still "fixed" in the system, the next interval can be longer (e.g., 84 days, a doubling of the previous interval as an example). However, if at 42 days, the error is coming back when the chaos is injected, then the error can be amplified (via Magnifier 306) and, possibly marked or indicated in some way, such that future intervals for an impact gap could be shorter, e.g., half of the 42 day interval (e.g., 21 days). This is all illustrative and not limiting, as will be understood.

Another kind of factor to be considered in determining chaos policy automatic regression is latency (delay in seconds), where, in an exemplary embodiment, a score or ranking can be computed that takes into account the impact a given exception had on the system. There are many ways to assign a ranking or score or other measure of comparison, as will be understood. For example, assume that a scheme exists to rank a type of impact using an arbitrary scale, say 0-10, with zero having no impact and 10 having the most severe impact. Assume that a given impact type had a "last" (most recent) impact latency score of 7, a "highest" impact score of 8, and a "lowest" impact score of 2, that results in an impact variance of 8−2=6. If analysis takes into account survivor bias, the analysis may apply applies a predetermined factor to assume that predictions are "off" by some predetermined factor, e.g., a factor of 4 but this is not limiting. Thus, that predetermined factor could be multiplied by the worst case (highest) impact, so 4×8=32, which corresponds to the "magnification" of the chaos to be injected. Although that type of an extreme delay of 32 might seem unrealistic to a human, an automatic magnifier, as used in at least some embodiments herein, has no biases in scheduling a chaos having a latency delay of 32 seconds, whereas a human might be resistant to attempting such chaos.

In certain embodiments, the same principles are applied to regression cycles (how often the Self-Configuring Chaos Engine System 300 injects the chaos automatically after it has been fixed to check if it has reoccurred). For example, the Self-Configuring Chaos Engine System 300 tracks the last occurrence of the exception and the second last occurrence of the exception. As this gap grows, the scheduler 387 can be configured to automatically, algorithmically reduce regression cycles, and as this gap shrinks the scheduler 387 similarly can be configured to automatically, algorithmically increase regression cycles. Similarly, another set of factors that can be considered for automatic regression, in certain embodiments, is the time between exceptions. For example, assume that, for the information processing system 200 of FIG. 2, that 60 days ago (1440 hours ago) there were 400 exceptions of a given type. Also assume that there is a count, over the 60 days, of the total number of exceptions of the given type, reaching 8100 exceptions over 60 days (1440 hours). In certain embodiments, the scheduler 387 can use this information, e.g., computing an average rate of 5.625 exceptions per hour, to generate (with optional scaling to increase or decrease this rate) the injection rate that can be used for a given chaos.

Accordingly, the Self-Configuring Chaos Engine System 300 has all the data it needs to automatically perform various types of regression, as desired in a given application, and hence there should be no need to re-run chaos tests manually just to verify regression for specific use cases for which resilience has been built in the past. With this approach, even the regression of chaos and resilience test can happen automatically and on the fly without having to plan, schedule and run these tests manually.

Referring again to FIG. 6, the operations of the Chaos Engine 380 are shown in their simplest manner. The Feedback Monitor 362 (also referred to herein as Feedback Loop Engine 362) is configured to find occurrences 632 of certain exceptions (block 632), which are then processed by the Log Stream Analyzer 302 (also known as a Log Evaluator) 302. If there is more than one occurrence (block 632), then the chaos Policy Composer 308 (also referred to herein as chaos policy manager) is configured to add a policy via Policy Composer/manager 308. If there is not more than one occurrence of a given exception, then the policy can be deleted 642. The scheduler 387 (FIG. 3)

The following examples/scenarios further demonstrate additional implementations of at least some embodiments of the Self-Configuring Chaos Engine System 300 discussed herein.

Example 1: An application runs on 20+ containers—and there is an occasional issue in connectivity between one of those containers and the email server. The issue has only occurred a couple of times, but the underlying cause of the problem is a cable fault that has the potential of having a much larger impact in the future. In accordance with at least some embodiments of the Self-Configuring Chaos Engine System 300, the chaos configuration for this application is automatically updated to find this issue, replicate it, magnify it, and push the issue into the development environment so that the development team is forced to build resilience around this issue. As the development team builds resilience around this issue, the Feedback Monitor 362 automatically removes this chaos from the automatically configured set of chaos policies 382 of the Chaos Engine 380 and marks it as the chaos that needs to be checked periodically for regression. Because the issue has only occurred a couple of times in production there is no reason for the log monitoring teams to be worried about it. The Magnifier 306 (also referred to herein as Amplifier 306), however, helps to remove this human bias and forces the development team to build resilience around this issue.

Example 2: An old bug around two years ago caused a major system outage. The developers had fixed this issue. However, as the developers change the code, the potential of the issue re-occurring has surfaced, and the system is no longer resilient to deal with that issue. Because the issue has been marked as closed years ago, there is no reason for the development or testing teams to be doing regression checks around this issue. Even in this example, in accordance with at least some embodiments, the Self-Configuring Chaos Engine System 300 silently introduces the same chaos (from two years ago) into the system and checks the feedback loop to ensure that the system is still resilient against the error. If it is, the specific chaos policy configuration is silently removed, and if it is not, the chaos is amplified to bring to the team's notice in the development and UAT environments.

Example 3: A specific user has come across an issue in production wherein if the user injects specific data values in a field, doing that causes a part of the application to crash with a runtime exception. The use has not bothered to report the issue, and it has only occurred a couple of times; however, there is a potential of this issue leading to a cross-site scripting attack or catapulting into a bigger issue in the future as more and more users start using that same data value. Even in this case because the issue has recently occurred, and even if the occurrence is low, the Log Stream Analyzer 302 of the Self-Configuring Chaos Engine System 300 is able to detect this error. Based on the impact it causes as well as the potential it poses, the Self-Configuring Chaos Engine System 300 assigns this issue a higher priority. As a result, the magnifier 306 magnifies the issue and injects it into the UAT and development environment. This action effectively forces the development and UAT team to work out a fix and resilience against that issue.

Example 4: While everyone in the log monitoring team is busy focusing on issues such as long tails, occurrences of specific kinds of security exceptions have started surfacing a couple of times in the logs. These security exceptions indicate that a hacker was once able to try a denial of service (DOS) attack on one of the containers running in a system, and the hacker got the container to be rebooted. No one on the team has looked at this specific issue because it has not become a long tail or hasn't occurred a specific number of times. However, in accordance with at least some embodiments herein, having the Log Stream Analyzer 302 allows the auto-configurator (i.e., the Self-Configuring Chaos Engine System 300) to not just see the DoS issue but also to amplify it and replicate it in production and UAT environments for the team to evaluate further. As the team starts looking at the DoS issue and building resilience around the DoS issue, the team essentially closes a backdoor the hacker may have exploited in the distant future had it been left open. Furthermore, it is possible that this type of exception would have never shown up in future logs because the hacker had succeeded in finding a backdoor, so there was no reason for the hacker to try the same attack again.

As the above examples and the above description above for FIGS. 1-6 demonstrates, at least some embodiments herein provide a completely self-configuring and self-evolving chaos engine configurator (Self-Configuring Chaos Engine System 300) that can work with any of the commercially available chaos engines as well as the chaos engines and/or anomaly detection systems referred to in the aforementioned incorporated by reference patent documents, and the chaos engine described in the embodiments herein, as well as others known in the art and/or developed in the future, to help address and resolve a variety of real-life types of issues. In certain embodiments, the Self-Configuring Chaos Engine System 300 provides at least the following features and advantages.

First, in certain embodiments, no manual configuration is required to configure the Chaos Engine 380. This also means the chaos configuration is a self-evolving entity and that the Self-Configuring Chaos Engine System 300 can be deployed using a set-and-forget mindset.

Second, in certain embodiments, the configuration of the Self-Configuring Chaos Engine System 300 is not subjected to human biases e.g., the survivor bias which seems to suggest that the highest visible exception in the system is usually the most fatal one, or the anti-fragility bias which seems to suggest that the magnitude of the exception (e.g., latency) will not cross the last known threshold. The aforementioned heuristic-based configuration can help to bypass and overcome all of these human biases.

Third, at least some embodiments herein provide an ability to reflect ever-changing infrastructure. As noted previously, manually configuring chaos policies to constantly keep reflecting the ever-changing infrastructure in an organization can be costly and time consuming. Consider, as an example type of exception, a major memory upgrade or scaling effort of the application into which chaos is being injected. When the Self-Configuring Chaos Engine System 300 is used to inject chaos at the infrastructure level, the chances of "out of memory" exceptions occurring are drastically reduced. In contrast, in a traditional chaos engine design, this will have to be reflected manually in the chaos engine.

Fourth, at least some embodiments herein provide spaced repetition of the chaos injection process. As is understood, many humans work under the assumption that bugs and exceptions that happened months ago and that were explicitly addressed will never happen again since we fixed them. As discussed herein, this assumption is far from the truth, because regression errors and exceptions as the code changes are a reality. Having a heuristic-based algorithm that picks up errors and exceptions that occurred a long time ago, in accordance with at least some embodiments herein, helps to ensure that the Self-Configuring Chaos Engine System 300 has spaced repetition when it comes to introducing chaos and verifying resilience against that chaos.

Fifth, at least some embodiments herein provide automatic feedback loops and regression checks—The abovementioned spaced repetitions and the fact that any work done by development teams on introducing resilience into the system can be picked up by at least some embodiments of the Self-Configuring Chaos Engine System 300 as discussed herein, means that at least some embodiments have a complete feedback loop. This means that the Self-Configuring Chaos Engine System 300 can silently configure itself to introduce chaos that happened twelve months ago, verify that the system still has the resilience in place to deal with that chaos, and then swap out that chaos-all without anyone finding out that it did that, or having to manually configure it to check.

In at least some embodiments of the Self-Configuring Chaos Engine System 300, there are at least these advantages, because the Self-Configuring Chaos Engine System 300 in at least some embodiments, is configured to:

1. Work automatically with many different commercial and/or proprietary chaos engines (especially those with application programming interfaces (APIs)—having the ability for the chaos engine system to be self-configuring (such that the entire act of creating, maintaining, removing, and updating chaos policies becomes completely automated) has potential to save countless hours in configuring chaos policies manually and then keeping them updated with underlying infrastructure changes;

2, Perform automated regression to ensure resilience, without any human intervention whatsoever, which also saves time and money and can improve the types of regression performed, as noted previously;

3. Ensure that development teams can discover potential chaos and build automatic resilience around that chaos before it becomes a problem in production;

4. Keep chaos policies automatically updated based on underlying infrastructure changes without requiring any human intervention; and 5. Remove human biases out of chaos configuration, making the Self-Configuring Chaos Engine System 300 completely objective and automatic when it comes to resilience.

As will be appreciated by those of skill in the art, the first through fifth features and advantages, as well as the above benefits #1-#5, also are applicable to any enterprise at large and with any chaos engine or chaos arrangement that currently requires any manual configuration of its policies, where these arrangements can help such manually configurable systems to become automatically self-configuring. In some embodiments, the Self-Configuring Chaos Engine System 300 can be configured as a "configuration plugin" for commercially available chaos engines, to help make such commercially available chaos engines smarter, freeing up many enterprises from having to spend extensive time and money in manually configuring and creating chaos experiments and manually having to do chaos regression. Thus, the embodiments described herein have many applications, as will be appreciated. It also is expected that the embodiments herein can be combined with and/or adapted to work with arrangements described in all patent documents that have been incorporated by reference herein, as well those described as many other patent documents and in other documents and products known in the art and/or developed in the future.

Figure 7:
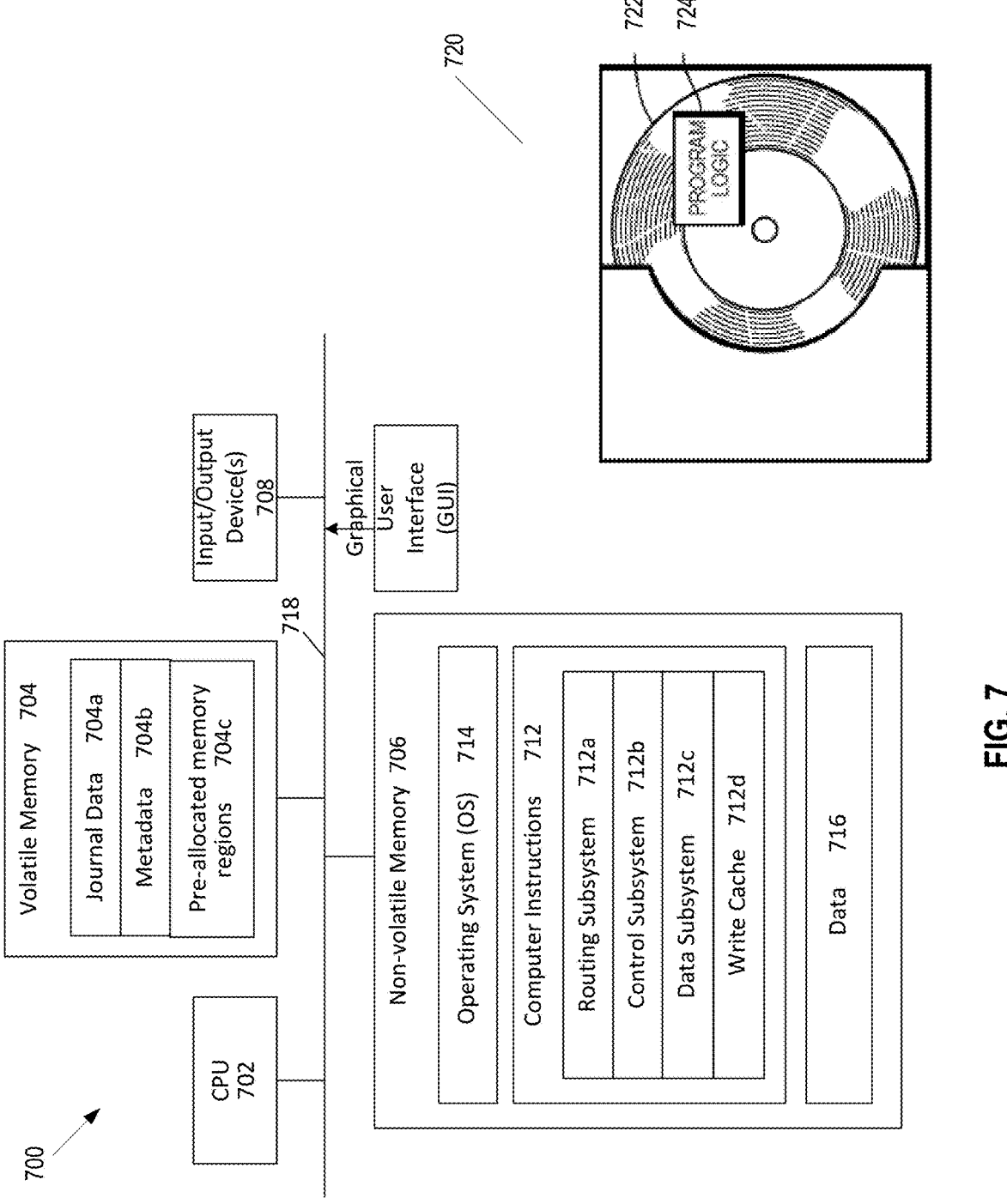
FIG. 7 is a block diagram of an exemplary computer system usable with at least some of the systems, methods, examples, and outputs of FIGS. 1-6, in accordance with one embodiment.

In certain embodiments, at least some embodiments herein are implemented using a computer system. For example, FIG. 7 is a block diagram of an exemplary computer system 700 usable with at least some of the systems, methods, examples, and outputs of FIGS. 2-6 in accordance with one embodiment. As shown in FIG. 7, computer system 700 may include processor/central processing unit (CPU) 702, volatile memory 704 (e.g., RAM), non-volatile memory 706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 710 (e.g., a touchscreen, a display, and so forth) and input and/or output (I/O) device(s) 708 (e.g., a mouse/keyboard, a camera, a microphone, speakers and optionally other custom sensors that provide user input, such as biometric sensors, accelerometers, position sensors, etc.). A bus 718 interconnects the CPU 702, volatile memory 704, non-volatile memory 706, GUI 710, and I/O devices 708.

Non-volatile memory 706 stores, e.g., journal data 704*a*, metadata 704*b*, and pre-allocated memory regions 704*c*. The non-volatile memory, 706 can include, in some embodiments, an operating system 714, and computer instructions 712, and data 716. In certain embodiment, the non-volatile memory 706 is configured to be a memory storing instructions that are executed by a processor, such as processor/CPU 702. In certain embodiments, the computer instructions 712 are configured to provide several subsystems, including a routing subsystem 712A, a control subsystem 712*b*, a data subsystem 712*c*, and a write cache 712*d*. In certain embodiments, the computer instructions 712 are executed by the processor/CPU 702 out of volatile memory 704 to implement and/or perform at least a portion of the systems and processes shown in FIGS. 1-13. Program code (e.g., computer program code) also may be applied to data entered using an input device or GUI 710 or received from I/O device(s) 708.

The systems, architectures, and processes of FIGS. 2-7 are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the methods discussed herein may be embodied as part of the computer system 700 described in FIG. 7. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor/CPU 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of computer program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, universal serial bus (USB) drives, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium (e.g., a non-transitory computer readable storage medium) and the computer program code is loaded into and executed by a machine, such as a computer, the machine becomes an apparatus for practicing the method.

When implemented on one or more processing devices, the computer program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the computer program code is loaded into and executed by a machine, such as the computer of FIG. 7, the machine becomes an apparatus for practicing one or more of the described embodiments. When implemented on one or more general-purpose processors, the computer program code combines with such a processor to provide a unique apparatus that operates analogously to specific logic circuits. As such a general-purpose digital machine can be transformed into a special purpose digital machine. FIG. 7 shows Program Logic 724 embodied on a computer-readable medium 720 as shown, and wherein the Logic is encoded in computer-executable code thereby forms a Computer Program Product 722. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

Unless specifically stated otherwise, those of skill in the art will appreciate that, throughout this detailed description, discussions utilizing terms such as "opening", "configuring," "receiving,", "detecting," "retrieving," "converting", "providing,", "storing," "checking", "uploading", "sending,", "determining", "reading", "loading", "overriding", "writing", "creating", "including", "generating", "associating", and "arranging", and the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The disclosed embodiments are also well suited to the use of other computer systems such as, for example, optical and mechanical computers. Additionally, it should be understood that in the embodiments disclosed herein, one or more of the steps can be performed manually.

In addition, as used herein, terms such as "module," "system," "subsystem", "engine," "gateway," "device,", "machine", "interface, and the like are intended to refer to a computer-implemented or computer-related in this application, the terms "component," "module," "system", "interface", "engine", or the like are generally intended to refer to a computer-related entity or article of manufacture, either hardware, software, a combination of hardware and software, software, or software in execution. For example, a module includes but is not limited to, a processor, a process or program running on a processor, an object, an executable, a thread of execution, a computer program, and/or a computer. That is, a module can correspond to both a processor itself as well as a program or application running on a processor. As will be understood in the art, modules and the like can be distributed on one or more computers.

Further, references made herein to "certain embodiments," "one embodiment," "an exemplary embodiment," and the like, are intended to convey that the embodiment described might be described as having certain features or structures, but not every embodiment will necessarily include those certain features or structures, etc. Moreover, these phrases are not necessarily referring to the same embodiment. Those of skill in the art will recognize that if a particular feature is described in connection with a first embodiment, it is within the knowledge of those of skill in the art to include the particular feature in a second embodiment, even if that inclusion is not specifically described herein.

Additionally, the words "example" and/or "exemplary" are used herein to mean serving as an example, instance, or illustration. No embodiment described herein as "exemplary" should be construed or interpreted to be preferential over other embodiments. Rather, using the term "exemplary" is an attempt to present concepts in a concrete fashion. In addition, the articles "a" and "an" as used in this application and the appended claims should be construed to mean "one or more" unless specified otherwise or clear from context to be directed to a singular form.

The terms "comprises," "comprising", "includes", "including", "having" and their conjugates, both in the Specification and the claims herein, at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. Additionally, terms such as "input," "output," "message" and "signal" may refer to one or more currents, one or more voltages, and/or a data signal. Within the drawings, like or related elements have like or related alpha, numeric or alphanumeric designators. Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the disclosure herein must comprise more than one of that element, nor is it intended by illustrating a single element that the any disclosure herein is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety. Individual elements of different embodiments described herein may be combined to form other embodiments not specifically set forth above. Various elements, which are described in the context of a single embodiment, may also be provided separately or in any suitable sub-combination.

What is claimed is:

1. A computer-implemented method, comprising:
monitoring a log stream generated in a system for at least a first issue, the log stream comprising information regarding operations of at least one component in operable communication with the system;
analyzing the log stream to identify and group the first issue together one or more other issues in a grouping, wherein the grouping comprises issues that are is associated with at least a first chaos that can be injected into the system;
generating automatically, based on the first chaos, a first chaos policy usable to run at a first chaos experiment on the system, wherein the first chaos policy is configured to inject the first chaos into the system, wherein the first chaos policy is added to a set of chaos policies used for running a first chaos experiment on the system;
determining, based on a result of the first chaos experiment, whether the system has resilience for the first chaos; and
removing the first chaos policy, automatically, from the set of chaos policies if, based on the result of the first chaos experiment, the system has resilience for the first chaos.

2. The computer-implemented method of claim 1, further comprising:
generating an alert to a developer of the system automatically if, based on results of the first chaos experiment, the system does not have resilience for the first chaos.

3. The computer-implemented method of claim 1, further comprising adding, if the first chaos policy is removed, the first chaos policy to a regression queue, the regression queue comprising information relating to one or more types of chaos for which the system has demonstrated, based on at least one or more corresponding respective chaos experiments, that it has resilience.

4. The computer-implemented method of claim 3, wherein the regression queue is associated with a set of priority factors, wherein the set of priority factors is configured to define when an automatic regression analysis is added to a second chaos experiment run on the system, wherein the computer-implemented method further comprises selecting, based on the set of priority factors, at least one type of chaos, from the one or more types of chaos stored in the regression queue, to inject into the system as part of the second chaos experiment.

5. The computer-implemented method of claim 1, further comprising:
determining whether the log stream comprises information relating to a second issue that corresponds to a critical function of the component; and
magnifying a magnitude of the second issue such that a second chaos policy is automatically generated, the second chaos policy is configured to inject a second chaos into the system, wherein the second chaos is related to the critical function of the component.

6. The computer-implemented method of claim 5, further comprising determining whether the second issue corresponds to a critical function based on an execution count associated with the critical function.

7. The computer-implemented method of claim 1, further comprising automatically adding the first chaos policy to a set of chaos policies associated with a chaos engine in operable communication with the system, wherein the chaos engine is configured to use the set of chaos policies to run one or more chaos experiments on the system.

8. The computer-implemented method of claim 7, wherein, if the chaos engine is operating in accordance with the set of chaos policies, the computer-implemented method further comprises automatically configuring the chaos engine to automatically restart if anything in the set of chaos policies changes.

9. A system, comprising:

a processor; and a non-volatile memory in operable communication with the processor and storing computer program code that, when executed on the processor, causes the processor to execute a process operable to perform operations of:

monitoring a log stream generated in an information system for at least a first issue, the log stream comprising information regarding operations of at least one component in operable communication with the information system;

analyzing the log stream to identify and group the first issue together one or more other issues in a grouping, wherein the grouping comprises issues that are is associated with at least a first chaos that can be injected into the information system;

generating automatically, based on the first chaos, a first chaos policy usable to run at a first chaos experiment on the information system, wherein the first chaos policy is configured to inject the first chaos into the information system, wherein the first chaos policy is added to a set of chaos policies used for running a first chaos experiment on the information system;

determining, based on a result of the first chaos experiment, whether the information system has resilience for the first chaos; and removing the first chaos policy, automatically, from the set of chaos policies if, based on the result of the first chaos experiment, the information system has resilience for the first chaos.

10. The system of claim 9, wherein the processor of the system further stores computer program code that, when executed on the processor, causes the processor to perform an action comprising adding, if the first chaos policy is removed, the first chaos policy to a regression queue, the regression queue comprising information relating to one or more types of chaos for which the information system has demonstrated, based on at least one or more corresponding respective chaos experiments, that it has resilience.

11. The system of claim 10, wherein the regression queue is associated with a set of priority factors, wherein the set of priority factors is configured to define when an automatic regression analysis is added to a second chaos experiment run on the information system, wherein the processor of the system further stores computer program code that, when executed on the processor, causes the processor to perform an action comprising selecting, based on the set of priority factors, at least one type of chaos, from the one or more types of chaos stored in the regression queue, to inject into the information system as part of the second chaos experiment.

12. The system of claim 9, wherein the processor further stores computer program code that, when executed on the processor, causes the processor to perform actions comprising:

determining whether the log stream comprises information relating to a second issue that corresponds to a critical function of the component; and magnifying a magnitude of the second issue such that a second chaos policy is automatically generated, the second chaos policy is configured to inject a second chaos into the information system, wherein the second chaos is related to the critical function of the component.

13. The system of claim 9, wherein the processor further stores computer program code that, when executed on the processor, causes the processor to perform an action comprising automatically adding the first chaos policy to a set of chaos policies associated with a chaos engine in operable communication with the information system, wherein the chaos engine is configured to use the set of chaos policies to run one or more chaos experiments on the information system.

14. The system of claim 13, wherein, if the chaos engine is operating in accordance with the set of chaos policies, the processor further stores computer program code that, when executed on the processor, causes the processor to perform an action comprising automatically configuring the chaos engine to automatically restart if anything in the set of chaos policies changes.

15. A computer program product including a non-transitory computer readable storage medium having computer program code encoded thereon that when executed on a processor of a computer causes the computer to operate a system, the computer program product comprising:

computer program code for monitoring a log stream generated in the system for at least a first issue, the log stream comprising information regarding operations of at least one component in operable communication with the system;

computer program code for analyzing the log stream to identify and group the first issue together one or more other issues in a grouping, wherein the grouping comprises issues that are is associated with at least a first chaos that can be injected into the system;

computer program code for generating automatically, based on the first chaos, a first chaos policy usable to run at a first chaos experiment on the system, wherein the first chaos policy is configured to inject the first chaos into the system;

computer program code for adding the first chaos policy is added to a set of chaos policies usable to conduct chaos experiments on the system;

computer program code for determining, based on a result of the first chaos experiment, whether the system has resilience for the first chaos; and computer program code for removing the first chaos policy, automatically, from the set of chaos policies if, based on the result of the first chaos experiment, the system has resilience for the first chaos.

16. The computer program product of claim 15, further comprising computer program code for adding, if the first chaos policy is removed, the first chaos policy to a regression queue, the regression queue comprising information relating to one or more types of chaos for which the system has demonstrated, based on at least one or more corresponding respective chaos experiments, that it has resilience.

17. The computer program product of claim 15, further comprising computer program code for automatically adding the first chaos policy to a set of chaos policies associated with a chaos engine in operable communication with the system, wherein the chaos engine is configured to use the set of chaos policies to run one or more chaos experiments on the system.

* * * * *